(12) United States Patent
 Cheung et al.

(10) Patent No.: US 10,942,628 B2
(45) Date of Patent: Mar. 9, 2021

(54) INTERACTIVE FLYER SYSTEM

(71) Applicant: FLIPP CORPORATION, Toronto (CA)

(72) Inventors: Matthew Cheung, Mississauga (CA); David Au-Yeung, Toronto (CA); Jeff Francis, Oakville (CA); David Meyers, Mississauga (CA); Wehuns Tan, Oakville (CA)

(73) Assignee: FLIPP CORPORATION, Toronto (CA)

( * ) Notice: Subject to any disclaimer, the term of this patent is extended or adjusted under 35 U.S.C. 154(b) by 0 days.

(21) Appl. No.: 16/825,271

(22) Filed: Mar. 20, 2020

(65) Prior Publication Data

US 2020/0218408 A1   Jul. 9, 2020

Related U.S. Application Data

(63) Continuation of application No. 15/243,141, filed on Aug. 22, 2016, now Pat. No. 10,599,291, which is a
(Continued)

(51) Int. Cl.
*G06F 3/0482* (2013.01)
*G06T 3/40* (2006.01)
(Continued)

(52) U.S. Cl.
CPC .......... *G06F 3/0482* (2013.01); *G06Q 30/02* (2013.01); *G06T 3/40* (2013.01); *G06T 11/60* (2013.01);
(Continued)

(58) Field of Classification Search
CPC .. G09G 5/391; G09G 5/006; G09G 2340/045; G09G 2360/121; G06T 3/40;
(Continued)

(56) References Cited

U.S. PATENT DOCUMENTS 6,137,914 A   10/2000   Ligtenberg et al.
6,393,407 B1   5/2002   Middleton, III et al.
(Continued)

FOREIGN PATENT DOCUMENTS

WO   2008/089231 A1   7/2008
WO   2011/003897 A2   1/2011

OTHER PUBLICATIONS

RFC 1945 "Hypertext Transfer Protocol—HTTP/1.0" (60 Pages), "User Agent" (5 Pages), http://tools.ietf.org/html/rfc1945#page-4, see also https://en.wikipedia.org/wiki/User_agent, 65 pages, May 1996.
(Continued)

*Primary Examiner* — Michelle L Sams
(74) *Attorney, Agent, or Firm* — Pearne & Gordon LLP

(57) ABSTRACT

An interactive flyer system is disclosed. The system includes a flyer image tiler for creating a flyer image tile set, the set including multiple copies of a flyer image segmented into a plurality of flyer image tiles with each copy representing the flyer image at one of a plurality of zoom levels, wherein a copy of the multiple copies is configured to fit within a viewport having a resolution, and a flyer image tile store for storing the flyer image tile set. There is also disclosed a method for displaying the interactive digital flyer.

24 Claims, 32 Drawing Sheets

Related U.S. Application Data continuation of application No. 14/631,960, filed on Feb. 26, 2015, now Pat. No. 9,424,813, which is a continuation of application No. 13/011,602, filed on Jan. 21, 2011, now Pat. No. 8,988,468.

(51) Int. Cl.
  *G09G 5/391* (2006.01)
  *G06Q 30/02* (2012.01)
  *G09G 5/00* (2006.01)
  *G06T 11/60* (2006.01)
  *G06T 1/60* (2006.01)

(52) U.S. Cl.
  CPC .............. *G09G 5/006* (2013.01); *G09G 5/391* (2013.01); *G06Q 30/0277* (2013.01); *G06T 1/60* (2013.01); *G06T 2207/20021* (2013.01); *G09G 2340/045* (2013.01); *G09G 2360/121* (2013.01)

(58) Field of Classification Search
  CPC .............. G06T 2207/20021; G06T 1/60; G06T 7/0079; G06T 11/60; G06T 2207/20221; G06F 3/0482; G06Q 30/02; G06Q 30/0277
  See application file for complete search history.

(56) References Cited

U.S. PATENT DOCUMENTS

| | | |
|---|---|---|
| 6,525,726 B1 | 2/2003 | Xie et al. |
| 7,075,535 B2 | 7/2006 | Aguera Y Arcas |
| 7,158,878 B2 | 1/2007 | Rasmussen et al. |
| 7,209,148 B2 | 4/2007 | Rasmussen et al. |
| 7,379,811 B2 | 5/2008 | Rasmussen et al. |
| 7,441,207 B2 | 10/2008 | Filner et al. |
| 7,554,543 B2 | 6/2009 | Aguera Y Arcas |
| 7,570,828 B2 | 8/2009 | Rasmussen et al. |
| 7,599,790 B2 | 10/2009 | Rasmussen et al. |
| 7,620,496 B2 | 11/2009 | Rasmussen et al. |
| 7,698,340 B2 | 4/2010 | Ye et al. |
| 7,831,387 B2 | 11/2010 | Golding et al. |
| 1,872,650 A1 | 1/2011 | Fay |
| 7,864,186 B2 | 1/2011 | Robotham et al. |
| 7,865,301 B2 | 1/2011 | Rasmussen et al. |
| 7,894,984 B2 | 2/2011 | Rasmussen et al. |
| 7,920,968 B2 | 4/2011 | Chapin et al. |
| 7,941,525 B1 | 5/2011 | Yavilevich |
| 7,962,281 B2 | 6/2011 | Rasmussen et al. |
| 8,005,613 B2 | 8/2011 | Rasmussen et al. |
| 8,130,245 B2 | 3/2012 | Ham et al. |
| 2001/0037223 A1 | 11/2001 | Beery et al. |
| 2002/0118224 A1 | 8/2002 | Levanon et al. |
| 2004/0103371 A1 | 5/2004 | Chen et al. |
| 2005/0160014 A1 | 7/2005 | Moss et al. |
| 2005/0270299 A1 | 12/2005 | Rasmussen et al. |
| 2005/0270305 A1 | 12/2005 | Rasmussen et al. |
| 2005/0270311 A1 | 12/2005 | Rasmussen et al. |
| 2005/0288859 A1 | 12/2005 | Golding et al. |
| 2006/0103665 A1 | 5/2006 | Opala et al. |
| 2006/0139375 A1 | 6/2006 | Rasmussen et al. |
| 2006/0206264 A1 | 9/2006 | Rasmussen |
| 2006/0256130 A1 | 11/2006 | Gonzalez |
| 2006/0277231 A1 | 12/2006 | Kral et al. |
| 2007/0016368 A1 | 1/2007 | Chapin et al. |
| 2007/0073758 A1 | 3/2007 | Perry et al. |
| 2007/0096945 A1 | 5/2007 | Rasmussen et al. |
| 2007/0182751 A1 | 8/2007 | Rasmussen et al. |
| 2007/0229521 A1 | 10/2007 | Li et al. |
| 2007/0252834 A1 | 11/2007 | Fay |
| 2007/0279437 A1 | 12/2007 | Morimoto |
| 2008/0109327 A1 | 5/2008 | Mayle et al. |
| 2008/0174593 A1 | 7/2008 | Ham et al. |
| 2008/0222273 A1 | 9/2008 | Lakshmanan et al. |
| 2008/0231642 A1 | 9/2008 | Okita |
| 2008/0291205 A1 | 11/2008 | Rasmussen et al. |
| 2008/0309659 A1 | 12/2008 | Jacobson |
| 2009/0171813 A1 | 7/2009 | Byrne et al. |
| 2009/0198767 A1 | 8/2009 | Jakobson et al. |
| 2009/0287797 A1 | 11/2009 | Rasmussen et al. |
| 2009/0317010 A1 | 12/2009 | Gerhard et al. |
| 2009/0317020 A1 | 12/2009 | Gerhard et al. |
| 2010/0020091 A1 | 1/2010 | Rasmussen et al. |
| 2010/0042476 A1 | 2/2010 | Gauri |
| 2010/0083163 A1 | 4/2010 | Maghoul et al. |
| 2010/0115462 A1 | 5/2010 | Spencer et al. |
| 2010/0146436 A1 | 6/2010 | Jakobson et al. |
| 2010/0201707 A1 | 8/2010 | Rasmussen et al. |
| 2010/0229115 A1 | 9/2010 | Augustine et al. |
| 2011/0004828 A1 | 1/2011 | Callicrate et al. |
| 2011/0010629 A1 | 1/2011 | Castro et al. |
| 2011/0016376 A1* | 1/2011 | Hinson ................ G06F 16/957 715/205 |
| 2012/0075337 A1 | 3/2012 | Rasmussen et al. |

OTHER PUBLICATIONS https://web.archive.org/web/20100816175725/http://www.w3.org/Protocols/HTTP/HTRQ_Headers.html; May 3, 1994; 7 pages.
https://web.archive.org/web/20101130012831/http; //en.wikipedia.org/wiki/User_agent; Nov. 28, 2010; 3 pages.
Open Layers API (JavaScript Library), http://web.archive.org/web/20101006221043/http://trac.osgeo.org/openlayers/wiki/OpenLayersOptimization, Jun. 10, 2010 (Jun. 10, 2010), 2 pages.
Open Layers API (JavaScript Library) http:web.archive.org/web/20090321135708/http://www.openlayers.org/ Mar. 21, 2009 (Mar. 21, 2009), 2 pages.

\* cited by examiner

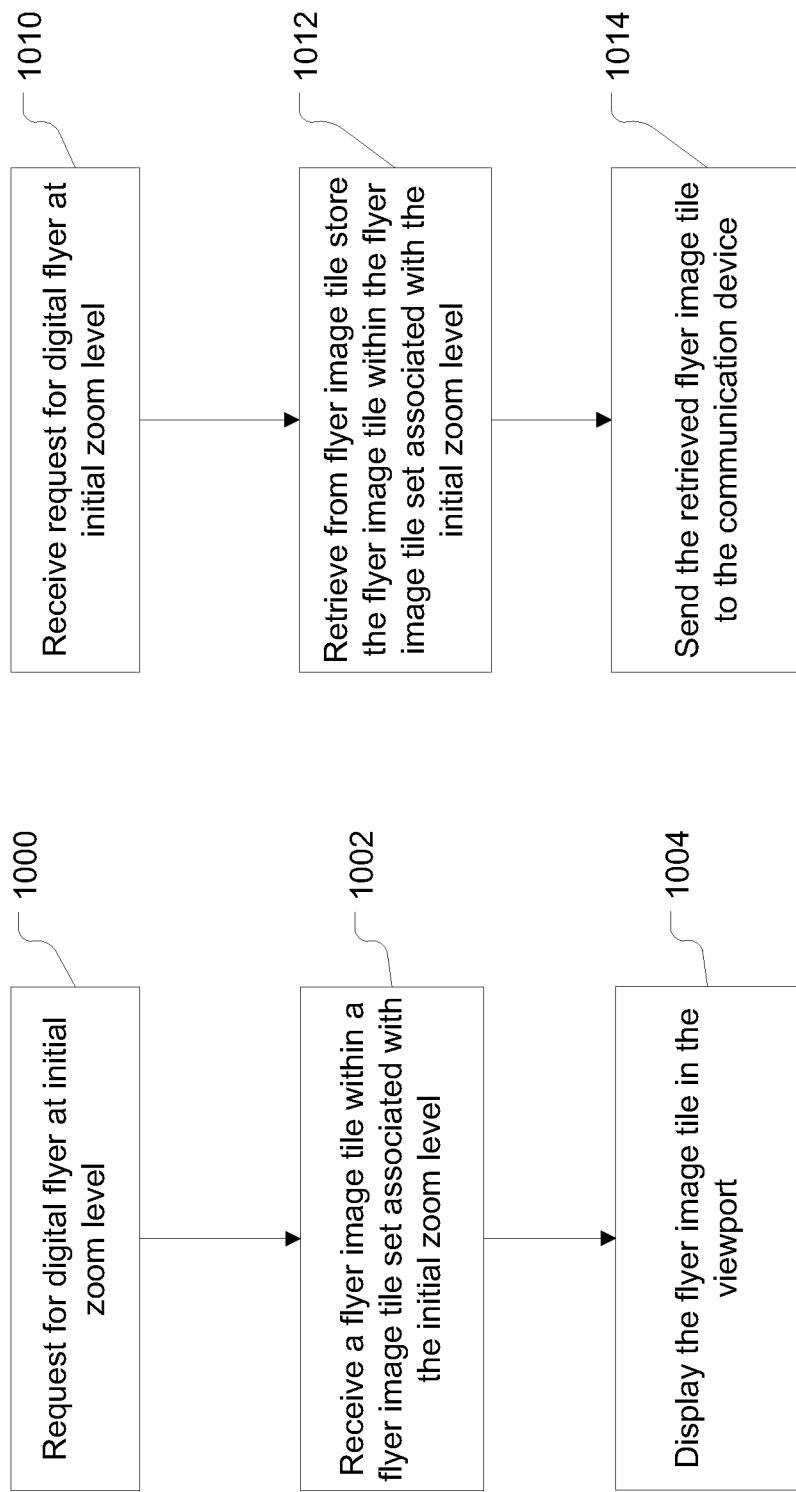

INTERACTIVE FLYER SYSTEM

TECHNICAL FIELD

The present disclosure relates to digital flyers and, in particular, to an interactive digital flyer.

BACKGROUND

Marketing is an integral part of doing business that allows businesses to identify and attract new and potential customers to the business. It is also an important strategy to ensure that past customers become repeat customers.

There are many forms of marketing. However, one of the oldest forms of marketing is the use of information pamphlets to inform the public about the wares and services that the business offers. Such pamphlets can be generally referred to as "flyers", but which can also be referred to as a circular, handbill, leaflet, or ad. A more comprehensive pamphlet about wares carried by the business may also be referred to as a catalogue, parts book, and trade literature. Collectively, such forms of information pamphlets will be described hereon in as a "flyer".

Flyers are often used not only to inform the public about the wares and services offered by the business but also to convey information about prices and special deals, often for a limited time. For example, a grocery store may circulate a printed flyer advertising produce and meats on sale. In addition, the printed flyer may contain coupons that entitle the purchaser to a certain discount. This coupon not only entices the customer to visit the store but also provides feedback to the store about the effectiveness of the printed flyer in generating business.

To distribute such printed flyers, a popular distribution medium has been to insert the flyers into newspapers in order to piggyback the distribution channels of widely read newspapers. Another often used medium is direct home distribution—a practice homeowners and renters often call "junk mail". However, distribution of printed flyers often came at great expense due to the number of flyers that had to be printed for distribution. Furthermore, environmentally conscious consumers often balked at the waste generated by the printed flyers.

With the digital revolution, businesses began to embrace the concept of "digital flyers". Digital flyers (also referred to as electronic flyers, online flyers, and Internet flyers) offer a significant cost saving over the traditional printed flyers and are "greener" than traditional printed flyers. Thus, the digital flyers industry has steadily grown, with many businesses, having an online presence, using digital flyers to market their products and services.

Presently, digital flyers are created by scanning each page of the printed flyers. In order to obtain high quality images, scanning must be done at a sufficiently high resolution. Alternatively, digital flyers may be provided by the retailers, which would also be used to print the paper version of the flyers. With the digital images, the digital flyer is created by stitching together the various images in a sequence that corresponds to the paper version of the same flyer. However, because of the size of is the digital image, there is often associated a slow browsing time. Moreover, because the flyer is simply an image, there are little additional functions and information associated with the digital flyer.

More advanced systems for providing digital flyers do exist. Such systems allow for a more fluid browser experience such as the ability to zoom-in and zoom-out of the image and have mechanisms to provide additional information about each item in the flyer (e.g. product description). However, the advanced systems rely on browser plug-in such as Adobe® Flash or other proprietary framework that requires a bulky initial download and lengthy installation. Moreover, the proprietary digital flyer system that runs on such proprietary framework are complex and requires significant resources on the client's device (such as a PC, Mac, smartphones, tablets and any other communications devices) to run smoothly.

In addition to the burden imposed on the client's device, there is a high operational burden for the businesses preparing the digital flyer. On existing systems, in order to provide any additional information on the flyer, the image had to be manually labelled and tagged. For example, to provide information about products presented on the flyer, each product had to be tagged. This is a time consuming process.

Lastly, existing digital flyers (like traditional paper flyers) do not provide detailed insights and feedback to the businesses as to how and where the viewers were interested and interacted with the flyer. At most, digital and printed flyers may provide feedback about viewer's interest in a particular product through coupons (in printed flyers) or click-throughs of manually tagged items (in digital flyers).

Therefore, a new generation of interactive digital flyers that addresses at least some of these shortcomings would be highly desirable.

SUMMARY

According to an aspect of the present disclosure, there is disclosed an interactive digital flyer system comprising: a flyer image tiler for creating a flyer image tile set, the set including multiple copies of a flyer image segmented into a plurality of flyer image tiles with each copy representing the flyer image at one of a plurality of zoom levels, wherein a copy of the multiple copies is configured to fit within a viewport having a resolution; and a flyer image tile store for storing the flyer image tile set.

According to another aspect of the present disclosure, there is disclosed a method of creating a flyer image tile set using a flyer image, the method comprising: determining a first dimension associated with a resolution of a viewport of a communication device; determining a first scaling factor for scaling the flyer image to fit within the first dimension of the viewport; determining a second dimension associated with a resolution required to display the flyer image at sufficient detail; determining a second scaling factor for scaling the flyer image to fit within the second dimension; determining a range between the first and second scaling factors, the range being used to determine a plurality of zoom levels; and generating a copy of the flyer image at each of the plurality of zoom levels, the copy being segmented into tiles.

In accordance with to another aspect of the present disclosure there is provided a computer readable storage medium storing instructions or statements for use in the execution in a processor of a method for creating a flyer image tile set using a flyer image as described above.

According to another aspect of the present disclosure, there is disclosed a method of displaying an interactive digital flyer on a communication device, the method comprising: requesting at the communication device for an interactive digital flyer at an initial zoom level, the request comprising device information of the communication device; receiving a flyer image tile within a flyer image tile set of the requested interactive digital flyer, the set including multiple copies of a flyer image segmented into tiles with each copy representing the flyer image at one of a plurality of zoom levels, the flyer image tile at the initial zoom level being associated with a is copy of the multiple copies configured to fit within the viewport; and displaying the flyer image tile at the initial zoom level in the viewport.

In accordance with to another aspect of the present disclosure there is provided a computer readable storage medium storing instructions or statements for use in the execution in a processor of a method for displaying an interactive digital flyer on a communication device as described above.

According to another aspect of the present disclosure, there is disclosed a method of processing an interactive digital flyer comprising: receiving a request for an interactive digital flyer at an initial zoom level, the request comprising device information of the communication device; retrieving from a flyer image tile store a flyer image tile within a flyer image tile set of the requested interactive digital flyer, the set including multiple copies of a flyer image segmented into tiles with each copy representing the flyer image at one of a plurality of zoom levels, the flyer image tile at the initial zoom level being associated with a copy of the multiple copies configured to fit within the viewport; and sending the retrieved flyer image tile to the communication device.

In accordance with to another aspect of the present disclosure there is provided a computer readable storage medium storing instructions or statements for use in the execution in a processor of a method for processing an interactive digital flyer as described above.

According to another aspect of the present disclosure, there is disclosed a method of generating an interactive digital flyer using a flyer image, the method comprising: creating a base layer comprising a flyer image tile within a flyer image tile set, the set including multiple copies of the flyer image segmented into a plurality of flyer image tiles with each copy representing the flyer image at one of a plurality of zoom levels, wherein a copy of the multiple copies is configured to fit within a viewport having a resolution; and defining a geometry layer including co-ordinate and scaling information for the flyer image tile set.

In accordance with to another aspect of the present disclosure there is provided a computer readable storage medium storing instructions or statements for use in the execution in a processor of a method of generating an interactive digital flyer using a flyer image as described above.

According to another aspect of the present disclosure, there is disclosed a method of creating a digital flyer with contextual information in a viewport of a communication device, the method comprising: receiving a source flyer image and polygon mapping information associated with a digital flyer from a server, the polygon mapping information comprising a polygon for defining a polygonal area on the source flyer image, the polygon being tagged with contextual information; and overlaying the source flyer image with the polygon mapping information.

In accordance with to another aspect of the present disclosure there is provided a computer readable storage medium storing instructions or statements for use in the execution in a processor of a method of creating a digital flyer with contextual information in a viewport of a communication device as described above.

According to another aspect of the present disclosure, there is disclosed a system for contextualizing a digital flyer, comprising: a polygon mapping module for incorporating contextual information in the digital flyer using polygon mapping information, the polygon mapping information comprising a polygon for defining a polygonal area on a source flyer image of the digital flyer, the polygon being tagged with the contextual information; and a flyer data store for storing the tagged polygon.

According to another aspect of the present disclosure, there is disclosed a method of generating feedback for a digital flyer, the method comprising: retrieving device information of a communication device from a feedback data store; retrieving polygon mapping information from a flyer data store, the polygon mapping information comprising a polygon for defining a polygonal area on a source flyer image of the digital flyer, the polygon being tagged with contextual information; determining proportion of the viewport area occupied by the polygon; varying a pageview associated with the polygon based on the determined proportion; and generating a feedback report based on the pageview.

In accordance with to another aspect of the present disclosure there is provided a computer readable storage medium storing instructions or statements for use in the execution in a processor of a method of generating feedback for a digital flyer as described above.

In some embodiment, the interactive digital flyer system may respond to a request from a communication device by serving the flyer image tile displayable in the viewport of the communication device, or to be cached at the communication device, or both.

In some embodiment, the interactive digital flyer system may include a flyer data store for storing flyer-related information.

In some embodiment, the flyer-related information may include contextual information, point of interest, product specific information, or feedback information, or a combination thereof.

In some embodiment, the flyer image tile store includes a plurality of flyer image tile sets, each set comprising a copy of the flyer image configured to fit within one of a plurality of viewport resolutions.

In some embodiment, the plurality of viewport resolutions is associated with known resolutions of display screens.

In some embodiment, the interactive digital flyer system may include a feedback data store for storing feedback information.

In some embodiment, the feedback information may include viewscore for each flyer image tile, the viewscore being varied when the flyer image tile is served to a communication device.

In some embodiment, the feedback information may include date and time at which the viewscore was varied, an IP address of the communication device, or locale information of the communication device, or a combination thereof.

In some embodiment, the magnitude of variation of the viewscore may be dependent on the flyer image tile served, position of the flyer image tile served relative to the viewport, or the zoom level of the flyer image tile served, or a combination thereof.

In some embodiment, the viewscore may be used to generate a feedback report, to validate flyer-related information stored in a flyer data store, or both.

In some embodiment, the feedback report may be a frequency map, heat map, impression report, time-elapsed frequency map, timeline-based frequency map, or animated frequency map, or a combination thereof.

In some embodiment, the feedback information may be used to validate flyer-related information stored in a flyer data store.

In some embodiment, the flyer image tile to be cached at the communication device may be determined based on feedback information from a feedback store, a viewport information associated with the viewport of the communication device, or flyer-related information from a flyer data store, or a combination thereof.

In some embodiment, the plurality of zoom levels may be determined based on a binary zoom ratio, a flexible zoom ratio, or both.

In some embodiment, one of the copy of the flyer image at one of the plurality of zoom levels may be removed from the flyer image tile set.

In some embodiment, a new copy of the flyer image, segmented in tiles, at a new zoom level absent from the plurality of zoom levels may be added to the flyer image tile set.

In some embodiment, the method of displaying an interactive digital flyer may further comprise: requesting at the communication device for a new flyer image tile based on a viewer action, the request comprising device information; receiving the new flyer image tile based on the viewer action and displayable within the viewport of the communication device; and displaying the new flyer image tile in the viewport.

In some embodiment, the viewer action may be a zoom-in, zoom-out, or pan, or a combination thereof.

In some embodiment, the communication device may receive the new flyer image tile not yet displayable within the viewport of the communication device but for caching in a memory of the communication device.

In some embodiment, the communication device may further request for flyer-related information associated with the requested interactive digital flyer; and receive the requested flyer-related information.

In some embodiment, the flyer-related information may be displayed on the viewport of the communication device as a table of content, a navigation strip or both.

In some embodiment, the method of processing an interactive digital flyer may further comprise: receiving a request for a new flyer image tile based on a viewer action, the request including information related to the viewport of the communication device; retrieving the new flyer image tile from the flyer image tile store, the new flyer image tile being associated with the viewer action and displayable within the viewport of the communication device; and sending the new flyer image tile to the communication device.

In some embodiment, the method of processing an interactive digital flyer may further comprise: retrieving the new flyer image tile from the flyer image tile store, the new flyer image tile for caching at the communication device.

In some embodiment, the method of processing an interactive digital flyer may further comprise: retrieving flyer-related information associated with the requested interactive digital flyer from a flyer data store; and sending the retrieved flyer-related information to the communication device.

In some embodiment, the method of generating an interactive digital flyer further comprises assigning an initial viewscore to the flyer image tiles.

In some embodiment, the method of generating an interactive digital flyer further comprises creating a data layer having flyer-related information.

In some embodiment, the contextual information may include polygon mapping information.

In some embodiment, the base layer may include a plurality of flyer image tile sets, each set comprising a copy of the flyer image configured to fit within one of a plurality of viewport resolutions.

In some embodiment, the method of creating a digital flyer with contextual information further comprises: receiving point of interest information associated with the digital flyer from the server; and overlaying the source flyer image with the point of interest information.

In some embodiment, the method of creating a digital flyer with contextual information further comprises: generating navigational information using the polygon mapping information; and displaying the navigational information in a navigation interface.

In some embodiment, the navigational information includes a table of content, or a navigation strip, or both.

In some embodiment, the table of content may be generated by: locating all top-level polygons not contained within any other polygon; locating all next-level polygons contained in the top-level polygons but not contained within any other polygon; setting the next-level polygons located as the new top-level polygons; and repeating locating all the next-level polygons contained in the new top-level polygon but not contained with any other polygon until all the next-level polygons are located.

In some embodiment, a selected entry within the generated table of content may be indicated by zooming into the associated polygonal area, or by highlighting the associated polygonal area.

In some embodiment, the navigation strip includes a directly proportional navigation strip, a text-only proportional navigation strip, or an area proportional navigation strip, or a combination thereof.

In some embodiment, the directly proportional navigation strip may be generated by: applying a scaling factor to the polygon; labelling the scaled polygon with the contextual information corresponding to the polygon; and displaying the scaled polygon in the navigation interface.

In some embodiment, the text-only proportional navigation strip may be generated by: applying a scaling factor to the polygon; labelling the scaled polygon at a reference point with the contextual information corresponding to the polygon; creating a bounding box around the label; removing the scaled polygon; and displacing the label in a reference direction until the bounding box encounters a bounding box of another label or an edge of the navigation strip.

In some embodiment, the area proportional navigation strip may be generated by: determining a scaling factor relating the polygonal area of the polygon to distance on the navigation strip; ordering the polygon based on a criteria; and creating the navigation strip using the ordered polygon, wherein the distance on the navigation strip being determined by applying the scaling factor to the polygonal area of the ordered polygon.

In some embodiment, the method of creating a digital flyer with contextual information further comprises: generating related information using the polygon mapping information; and displaying the related information in a related information interface.

In some embodiment, the related information may be generated using the polygon mapping information by: retrieving a related digital flyer, the relevancy being based on the polygon mapping information of the digital flyer and polygon mapping information of the related digital flyer; ordering the retrieved related digital flyer based on the relevancy if there are more than one related digital flyer; and displaying the retrieved related digital flyers in the related information interface.

In some embodiment, the retrieved relevant digital flyer may be displayed in the related information interface using an area proportional navigation strip.

In some embodiment, the viewport information may be displayed in the navigation interface or related information interface using the determined scaling factor.

In some embodiment, the source flyer image comprises a flyer image tile set, the set including multiple copies of a flyer image segmented into a plurality of flyer image tiles with each copy representing the flyer image at one of a plurality of zoom levels, wherein a copy of the multiple copies is configured to fit within a viewport having a resolution.

In some embodiment, the communication device may send device information related to the communication device to the server.

In some embodiment, the device information comprises viewport information, date, time, time elapsed, session information, viewer information, or information related to the communication device, or a combination thereof.

In some embodiment, the polygon mapping module includes an interface to allow a user to define the polygon and tag the polygon with the contextual information.

In some embodiment, the interface is configured to allow the user to define a point of interest on the flyer image.

In some embodiment, the interface provides feedback information retrieved from a feedback data store to the user to help the user define the point of interest.

In some embodiment, the polygon mapping module tags the polygon, or defines a point of interest on the source flyer image based on predetermined information.

In some embodiment, the predetermined information comprises feedback information from a feedback data store.

In some embodiment, varying a pageview associated with the polygon based on the determined proportion includes varying the pageview of the polygon by a multiple of the determined proportion, or by the determined proportion corrected by a weighting factor.

In some embodiment, the weighting factor is associated with a typical viewport information.

In some embodiment, the polygon in the polygon mapping information may be used to better predict which one of a plurality of flyer image tiles within a flyer image tile set to serve to the communication device.

BRIEF DESCRIPTION OF THE DRAWINGS

These and other features of the disclosure will become more apparent from the following description in which reference is made to the appended drawings wherein:

FIG. 10A depicts a process for a communication device for requesting and receiving a flyer image tile set at an initial zoom level;

FIG. 10B depicts a process for an interactive flyer system for responding to a request as described in FIG. 10A;

DETAILED DESCRIPTION

Figure 1:
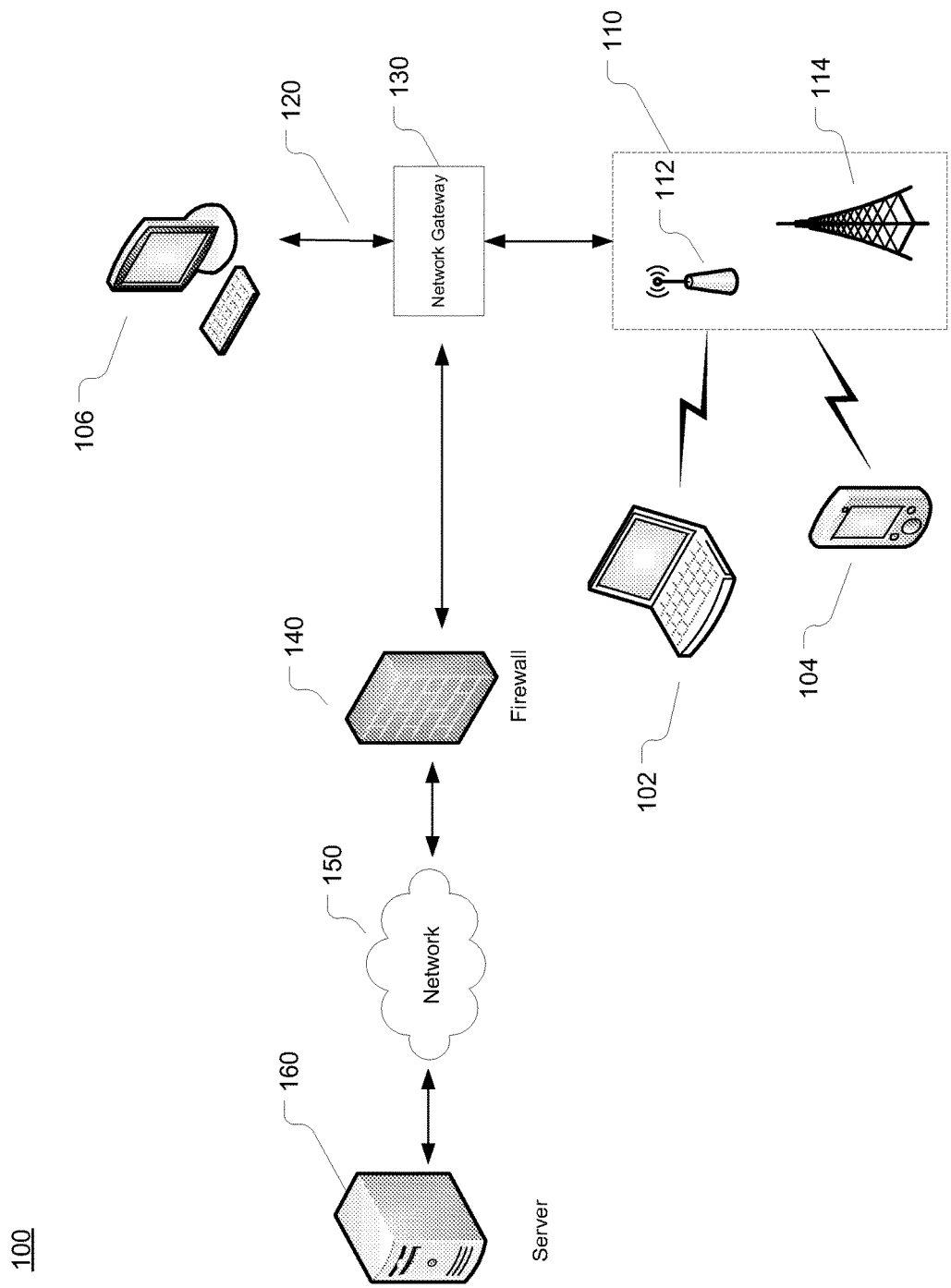
FIG. 1 depicts a block diagram of a communication system in which an embodiment of the present technology may be applied.

The present disclosure generally concerns an interactive digital flyer system having a multi-layer structure. The base layer includes a flyer image segmented into tiles that can be retrieved individually based on viewer action without loading the entire flyer image. The interactive flyer may further include a data layer that includes context information defined using polygons. The tiled flyer image permits the communication device to only download the appropriate tiles and thus minimizes download and improves efficiency. The tiled nature of the flyer image also allows the interactive flyer system to provide detailed implicit feedback information based on the tiles that were served to the communication device. Moreover, the context information defined using polygons allow for conveyance of contextual information quickly with less operational burden. The spatial and inclusionary relationship conveyed by the polygons may also be used to generate navigation information and to link to other related information. Furthermore, the polygon mapping information may be used in conjunction with device information to generate feedback information.

In this specification and the appended claims, the singular forms "a," "an," and "the" include plural references unless the context clearly dictates otherwise. Unless defined otherwise, all technical and scientific terms used herein have the same meaning as commonly understood to one of ordinary skill in the art to which this disclosure belongs.

It will be further understood that the terms "comprises" or "comprising", or both when used in this specification, specify the presence of stated features, integers, steps, operations, elements, and/or components, but do not preclude the presence or addition of one or more other features, integers, steps, operations, elements, components, and/or groups thereof.

The term "flyer", as described above, will be used generally to refer to forms of marketing that includes information about the wares and services that businesses offer. "Flyer" may also be known as circulars, pamphlets, handbills, leaflets, ads, catalogues, parts books, and trade literatures. In this specification, the term "flyer" will be used to collectively refer to the aforementioned forms of marketing.

The terms "interactive flyer", "digital flyer", and "interactive digital flyer" in this disclosure may be used interchangeably to refer to a flyer generated by an interactive flyer system according to an embodiment of the present technology.

The terms "left", "right", "up", and "bottom" in the present disclosure refers generally to the direction with respect to the viewport of the communication device. It will be understood that these terms are relative to the orientation of the viewport.

The terms "vertical"/"height"/"y-axis" and "horizontal"/"width"/"x-axis" in the present disclosure are used with respect to the viewport of the communication device. It will be understood that these terms are relative to the orientation of the viewport.

The term "device information" refers to information about the communication device. For example, the device information may include viewport information, timezone of the device, date and time at which the communication device is being operated, IP address, geographic locale, operating system, Internet browser information and other information. The viewport information is information related to the viewport of the communication device, including information about the display of the communication device.

The term "feedback information" refers to information used in generating a feedback report. In one embodiment, the feedback information may include device information sent from the communication device to determine, in conjunction with polygon mapping information, pageviews to generate the feedback report. In another implementation, the feedback information may include viewscore of each flyer image tile, which may be used to generate the feedback report.

The term "user" in the present disclosure is used to refer to any user of the interactive flyer system including publishers, vendors and viewers.

The term "publisher" refers to the user of the interactive flyer system responsible for preparing the interactive digital flyer according to an embodiment of the present technology.

The term "vendor" or "merchant" in this disclosure may be used interchangeably to refer to the business using the interactive digital flyer for marketing and business purposes.

The term "viewer" refers to the user of the interactive flyer system viewing the interactive digital flyer according to an embodiment of the present technology.

The term "wireless communication technology" is intended to describe any communication protocol that enables a communication device to communicate with a server without wires. By way of example, but not limitation, wireless communication protocol may include IEEE 802.11x standards (sometimes referred to as Wi-Fi) such as, for example, the IEEE 802.11a, 802.11b, 802.11g, and/or 802.11n standard. Other communication protocols include: IEEE 802.16e (also referred to as Worldwide Interoperability for Microwave Access or "WiMAX"); IEEE 802.20 (also referred to as Mobile Wireless Broadband Access); Mobitex Radio Network, DataTAC; GPRS (General Packet Radio System); TDMA (Time Division Multiple Access) including GSM (Global System for Mobile Communication); CDMA (Code Division Multiple Access) including CDMA 2000 and UTRA (Universal Terrestrial Radio Access); FDMA (Frequency Division Multiple Access); OFDMA (Orthogonal FDMA), SC-FDMA (Single-Carrier FDMA); CDPD (Cellular Digital Packet Data); iDEN (integrated Digital Enhanced Network); EvDO (Evolution-Data Optimized); EDGE (Enhanced Data rates for GSM Evolution); UMTS (Universal Mobile Telecommunication Systems); HSPDA (High-Speed Downlink Packet Access); and other various network technologies, including LTE-advanced technologies. An OFDMA system utilizes Orthogonal Frequency Division Multiplexing (OFDM) and sends modulation symbols in the frequency domain on orthogonal subcarriers, and may be implemented in technologies such as E-UTRA or E-UTRAN.

The details and particulars of these aspects of the technology will now be described below, by way of example, with reference to the attached drawings.

Referring to FIG. 1, there is shown a block diagram of a communication system 100 in which an embodiment of the present technology can be applied. It should be expressly understood that this figure is intentionally simplified to show only certain main components. The communication system 100 may include other components beyond what is illustrated in FIG. 1.

The communication system 100 includes a number of communication devices 102,104, 106 which may be connected to the communication system 100 in any of several different ways. Accordingly, three different types of communication devices 102, 104, 106 are depicted in FIG. 1 employing different exemplary ways of connecting to the communication system 100. It should be expressly understood that communication devices other than those shown in FIG. 1 may be used to connect to the communication system 100. Communication devices 102, 104, 106 may be connected to the server 160 using wireless technologies or wired communication technologies.

In one embodiment, communication devices 102, 104 may connect to the server 160 using wireless communication technology 110. To facilitate the provision of wireless technology 110, there may be provided one or more wireless RF Access Points (AP) 112 and base station 114.

In another embodiment, communication device 106 may connect to the server 160 using wired communication technology 120 such as IEEE 802.3 standard. Other wired communication technologies may be contemplated by a skilled person in the art.

Using wireless or wired technologies, communication devices 102, 104, 106 connect to the network gateway 130. The internal network 150 is typically behind a firewall 140, which serves to safeguard the internal network 150 from unauthorized access. Only authorized communication devices 102, 104, 106 are granted access to the server 160.

Figure 2:
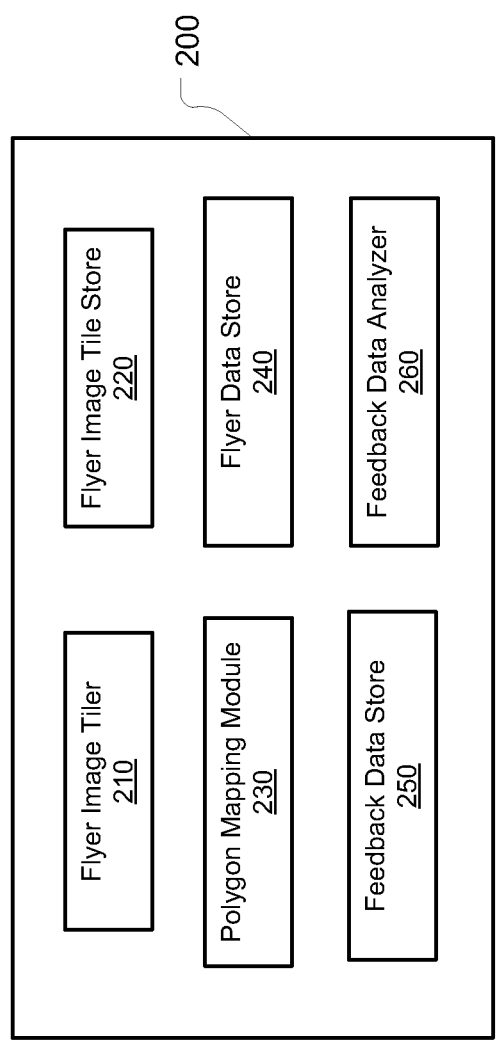
FIG. 2 shows a block diagram of an interactive flyer system according to an embodiment of the present technology.

Now turning to FIG. 2, a block diagram of an interactive flyer system 200 is shown. It should be expressly understood that this figure is intentionally simplified to show only certain main components. The interactive flyer system 200 may include other components beyond what is illustrated in FIG. 2. In one implementation, the interactive flyer system 200 may be implemented in the server 160. In another implementation, the interactive flyer system 200 may be implemented in a distributed environment.

As shown in FIG. 2, the interactive flyer system 200 includes a flyer image tiler 210 and a flyer image tile store 220. Additionally, the interactive flyer system 200 may include components for contextualizing the interactive flyer. The components may include a polygon mapping module 230 and a flyer data store 240. Furthermore, the interactive flyer system 200 may also include a feedback data store 250 and a feedback data analyzer 260. While the components of the interactive flyer system 200 are shown in FIG. 2 as distinct components, it will be understood that they may be implemented as a single component or grouped in any combination of components. Moreover, some of the components may reside externally. For example, the flyer image tile store 220 may be located remotely and accessed when generating the interactive flyer. The flyer image tile store 220, flyer data store 240, and feedback data store 250 may be implemented in any form of memory such as, but not limited to, random access memory (RAM), flash memory, magnetic disk, solid state drives or other forms of storage format.

Thus, as it will be described below, an interactive digital flyer comprises a base layer, a geometry layer and, optionally, a data layer. The base layer includes a source flyer image. However, according to an embodiment of the present technology, the source flyer image is a flyer image tile set having at least one flyer image tile. The flyer image tile set includes multiple copies of the flyer image at various zoom levels, with a copy of the flyer image at the most zoomed-out level being sized and formatted to fit within the resolution of the viewport of the communication device. Each copy of the flyer image at the varying zoom levels is segmented into tiles. The geometry layer contains co-ordinate and scaling information associated with the flyer image tiles. Where the interactive flyer system 200 includes a flyer data store 240, the interactive digital flyer may also include a data layer. Flyer data may include polygon mapping information, product data, point of interest information, feedback data and other information that will be discussed below. It will be understood that the interactive flyer may include a single data layer containing all the flyer data or may include multiple data layers with each data layer containing a type of flyer data. For example, first data layer may include polygon mapping data, second data layer may include product data, and so on.

The combination of these layers thus provides for an advanced interactive flyer. The base layer comprising of at least one set of flyer image tiles and the geometry layer enables the interactive flyer system 200 to provide advanced features such as zoom and pan without any additional proprietary software such as Adobe® Flash or Microsoft® Silverlight when used in a web browser. Moreover, the data layer provides contextual information that can be used in variety of ways to provide for advanced features. Where interactive flyer system 200 includes a feedback system, the data layer may be dynamically updated according to viewer behaviour. Thus the interactive flyer can change with viewer actions. These and other features of the interactive flyer system 200 will now be described in detail.

Interactive Flyer Structure

Figure 3:
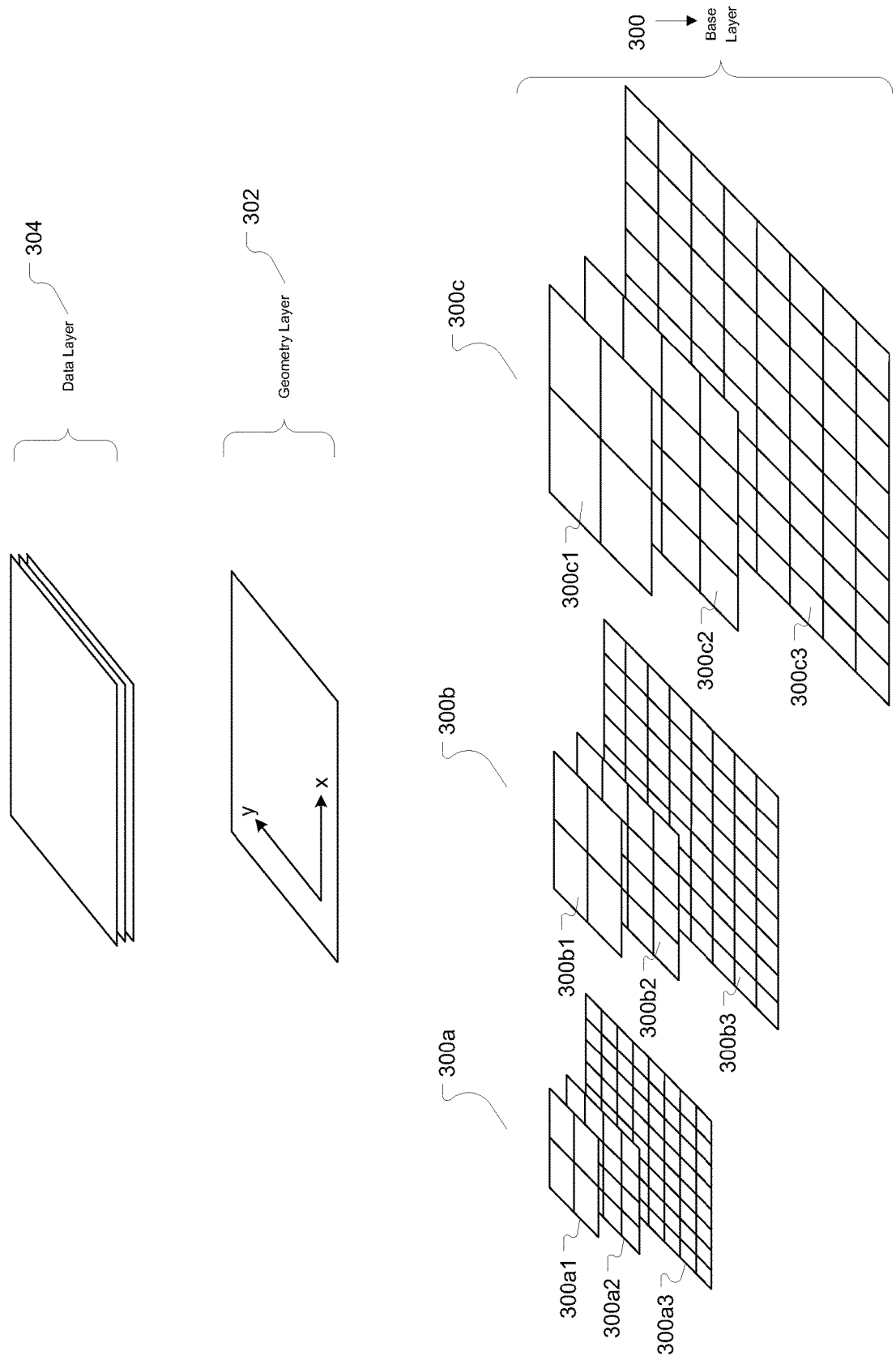
FIG. 3 illustrates the layers of an interactive flyer according to an embodiment of the present technology.

The interactive flyer according to the present technology comprises of several layers of information. Turning to FIG. 3, at its base, the interactive flyer includes the source flyer image. However, instead of a single image, the base layer 300 comprises multiple sets (e.g. 300*a*, 300*b*, 300*c*) of the flyer image for various screen resolutions, with each set including multiple copies (e.g. 300*a*1, 300*a*2, 300*a*3) of the flyer image and with each copy being the flyer image at a particular zoom level.

In FIG. 3, the base layer 300 includes three sets (300*a*, 300*b*, and 300*c*) of the flyer image, each set for different resolution of a viewport of a communication device. In each set, there contains multiple copies (e.g. 300*a*1, 300*a*2, 300*a*3) of the flyer image, with each copy representing a zoom level. In FIG. 3, each set (300*a*, 300*b* and 300*c*) is shown with three zoom levels (or two zoom steps) (e.g. 300*a*1, 300*a*2, and 300*a*3), with each copy of the flyer image in the set being segmented into tiles. In other words, there are at least one set of flyer images (e.g. 300*a*, 300*b*, 300*c*) where the most zoomed-out level of the flyer image in the set (e.g. 300*a*1, 300*b*1 or 300*c*1) is configured such that the entire flyer image fits within the viewport. Thus, in FIG. 3, the most zoomed-out level flyer image in the set (e.g. 300*a*1, 300*b*1, 300*c*1) is configured to fit three different resolutions of a viewport. For example, 300*a*1, 300*b*1 and 300*c*1 may be the flyer images for a communication device having resolutions 1024 by 768, 1280 by 800, and 1920 by 1080. From that zoomed-out level, each copy thereafter represents the flyer image at an increasing zoom level.

While FIG. 3 depicts three sets of the flyer image, it will be understood that there may be more or less than three sets of the flyer image. The details of segmenting the flyer image will be described in further details below.

Figure 4A:
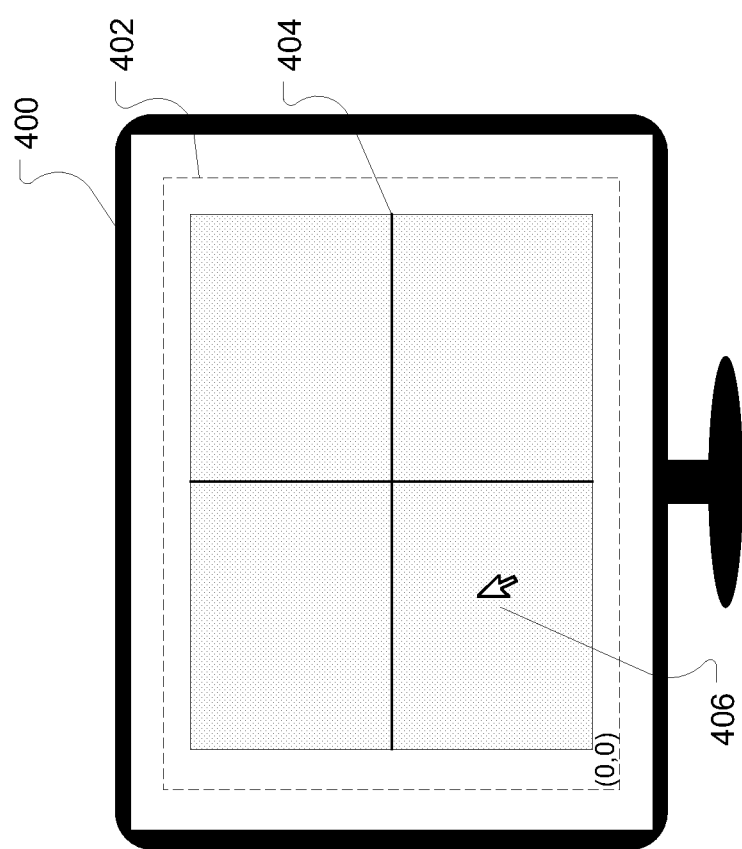
FIG. 4A illustrates an interactive flyer at the most zoomed-out level configured to fit within a viewport of a display of a communication device.

The interactive flyer further includes a geometry layer 302 that provides a reference system in the digital space for the tiled flyer images. For example, the geometry layer 302 may include a 2D X-Y coordinate system and scaling system to allow the digital flyer to seamlessly pan and zoom using the tiled images. Referring to FIG. 4A, a screen 400 is shown with its viewport 402 occupying a majority of the screen space. In the viewport 402, there is shown a flyer image 404 configured to fit the entire flyer image 404 within the viewport 402. In other words, the most zoomed-out view of the flyer image 404 in the tile set is configured to fit within the viewport 402.

Figure 4B:
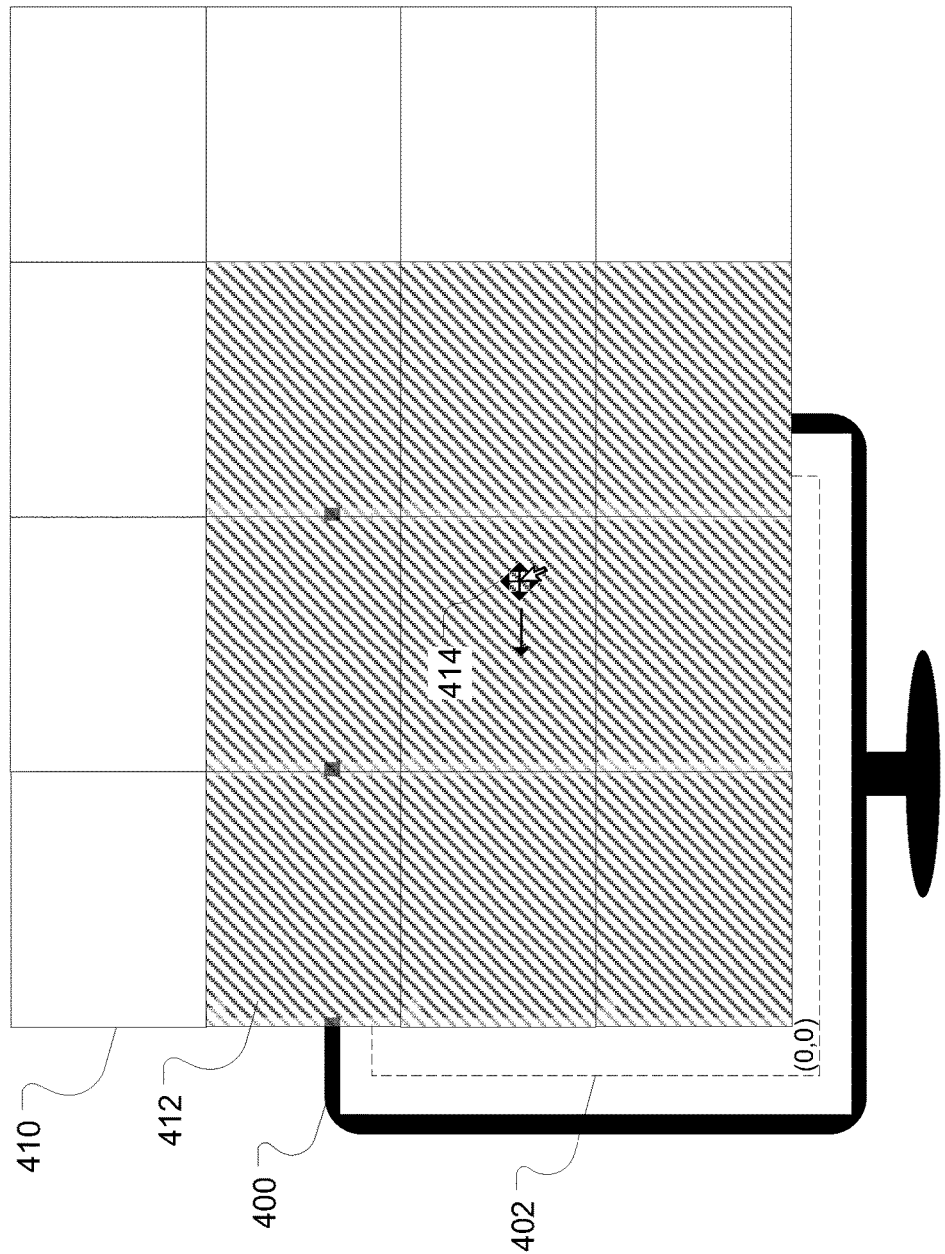
FIG. 4B illustrates the interactive flyer of FIG. 4A at the next zoom level.

To implement seamless panning and zooming of the flyer images using the tile set, a coordinate and scaling system may be used. In this embodiment, the coordinate system may designate the bottom left corner of the flyer image 404 as the starting coordinate (0,0). This allows the interactive flyer system 200 to determine where and how the viewer interacted with the flyer image 404. For example, if the viewer hovers using a mouse pointer 406 as shown in FIG. 4A and requests a zoom-in action (e.g. using a scroll wheel), the interactive flyer system 200 may determine which flyer image tile to retrieve as follows. First, using the coordinate system, the system is able to determine where in the flyer image the mouse pointer 406 is hovering. This can be done by converting the coordinate where the mouse pointer 406 is located to pixel equivalent of the flyer image 404. In one embodiment, the system may utilize the resolution (e.g. DPI (dots per inch)) of the flyer image. Thereafter, the system may retrieve the tiled images in the next zoom level that is displayable within the viewport 402. For example, FIG. 4B depicts the flyer image 410 at the next zoom level. As it can be seen, the flyer image 410 at the next zoom level is greater in resolution and thus, larger than the flyer image 404 at the previous zoom level. At this zoom level, the system retrieves the shaded flyer image tiles 412 that are displayable within the viewport 402. Thus, as the viewer pans using the pointer 414, the appropriate flyer image tiles are loaded and shown in the viewport 402.

The interactive flyer may also include a data layer 304 that provides flyer-related information such as context (i.e. polygon mapping information as it will described below), product data, points of interest and feedback information.

Figure 5:
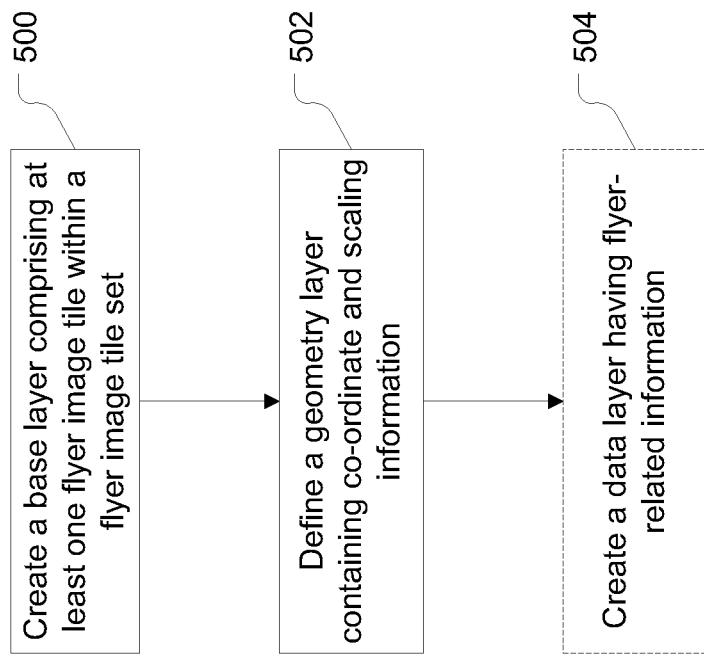
FIG. 5 shows a process for generating the interactive flyer according to an embodiment of the present technology.

Thus, according to an embodiment of the present technology, an interactive flyer is generated by creating a base layer comprising at least one flyer image tile within a flyer image tile set (i.e. 500 in FIG. 5). Each flyer image tile set represents the flyer image configured for common resolutions of a display of a communication device. For example, there may be two sets of flyer image tiles with one set configured for a display having 1920 by 1080 resolution and the other set configured for a display having 1024 by 768 resolution. In each set, there contains multiple copies of the flyer image, with each copy representing the flyer image at a particular zoom level. Furthermore, each copy of the flyer image is segmented into tiles. Thereafter, a geometry layer is defined with the geometry layer containing co-ordinate and scaling information about the flyer image tiles (i.e. 502 in FIG. 5). The interactive flyer may further include creating a data layer having flyer-related information (i.e. 504 in FIG. 5). The data layer may further include context, points of interest, product specific data and feedback information. As discussed above, there may be one or more data layers incorporating the flyer-related information.

While FIG. 5 depicts a process comprising process elements 500, 502 and 504 in order, it will be understood that the process elements 500, 502 and 504 may be carried out in other orders. It will also be understood that other process depicted in other figures may also be carried out in other orders as reasonably contemplated.

Tiled Flyer Image

Figure 6:
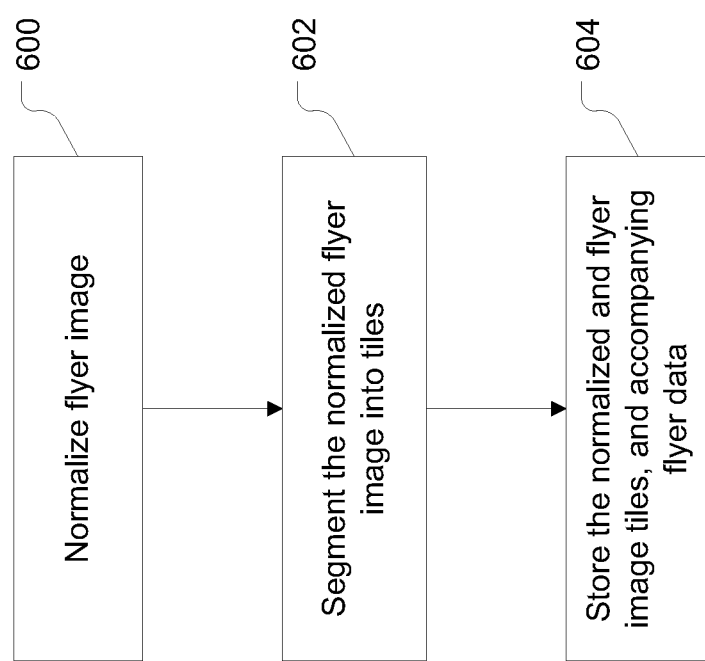
FIG. 6 illustrates a process for preparing a flyer image for use in the base layer as shown in FIG. 3 in generating an interactive flyer.

Referring to FIG. 6, preparation of the flyer image tile set for use in the base layer of the interactive flyer begins with obtaining the flyer image. The flyer image may be provided by the retailer or may be scanned from the printed-version of the flyer. The flyer image is then normalized (i.e. 600 in FIG. 6). Normalization refers to the process of manipulating the flyer image to conform the flyer image to a standard format. This may entail applying some form of image processing, such as crop, image alignment, image adjustment and image scaling.

The normalized flyer image is then segmented into tiles (i.e. 602 in FIG. 6). Tiles are portions of the flyer image at varying resolutions optimized for different screen sizes and resolutions. Because of the bounded nature of a flyer, the flyer image is optimized such that, at the most zoomed-out level, the full image of the flyer fits within the dimensions of the viewport, while at the most zoomed-in level, the flyer page includes the necessary level of details. For example, if the flyer page includes fine prints, the most zoomed-in level should include sufficient level of detail to allow the viewer to read the fine prints.

Using this range (i.e. the most zoomed-out to zoomed-in level) as reference, the flyer image tiler 210 generates multiple copies of the flyer image at different resolutions, with each copy representing the flyer image at increasing zoom level. In other words, with the range determined, the flyer image tiler 210 generates a copy of the flyer image for each zoom level, with each copy containing more resolutions than the previous copy to provide greater level of detail. These multiple copies represent one set of the flyer image tiles (e.g. 300a in FIG. 3) and the process is repeated for other commonly known resolutions of display screens (e.g. 300b and 300c in FIG. 3). The generated tiles, the normalized flyer image, and the information related to the flyer image (i.e. coordinate system and zoom levels) may then be stored in the flyer image tile store 220 (i.e. 604 in FIG. 6).

Figure 7:
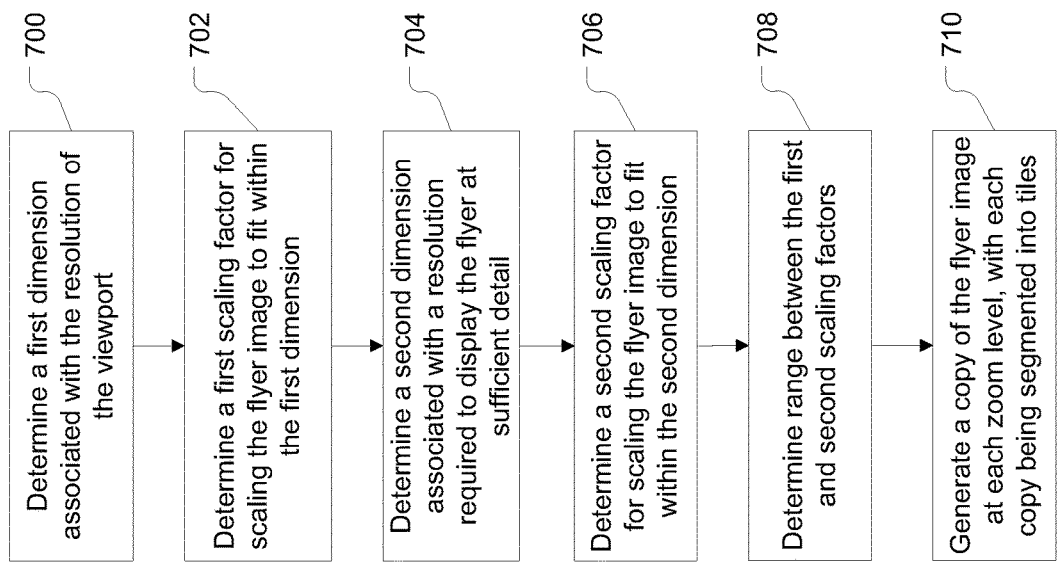
FIG. 7 illustrates a process for segmenting the flyer image according to an embodiment of the present technology.
Figure 9:
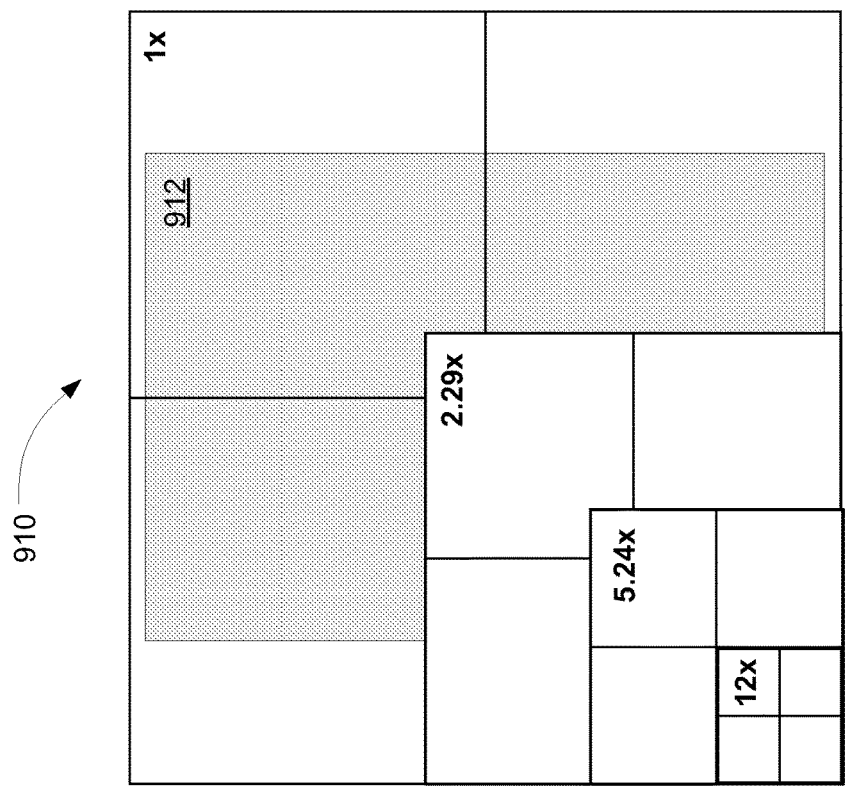
FIG. 9 illustrates another exemplary flyer image tile set segmented using a flexible zoom ratio.
Figure 8:
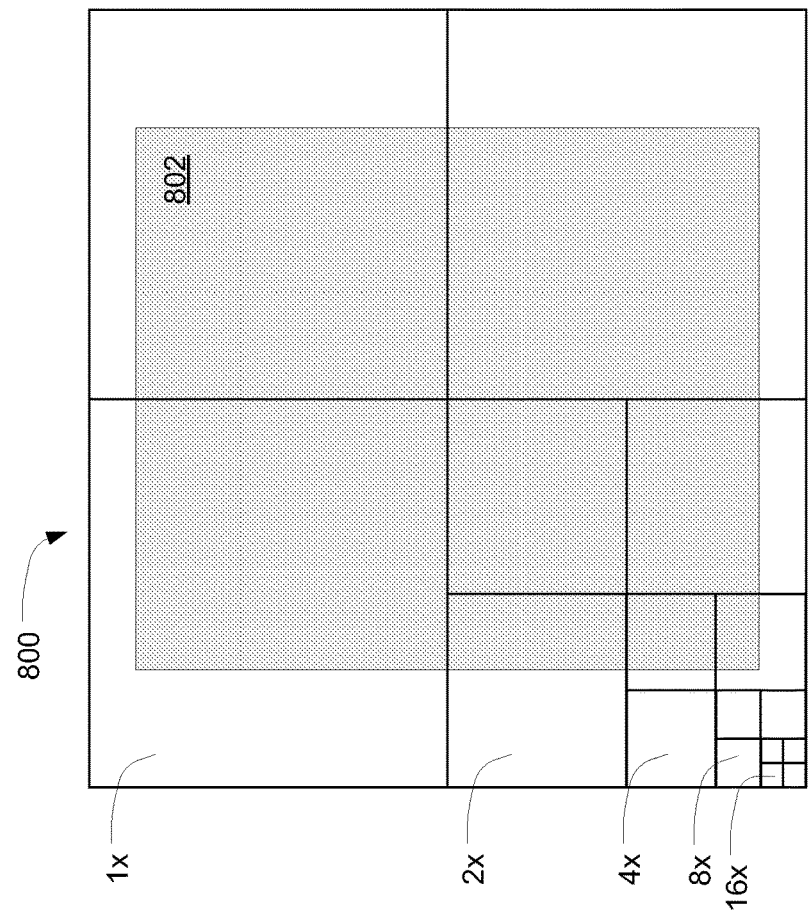
FIG. 8 illustrates an exemplary flyer image tile set segmented using a binary zoom ratio.

Turning to FIGS. 7-9, an example embodiment of segmentation of the flyer image will be described in detail (i.e. 602 in FIG. 6). The flyer image tiler 210 determines the dimension associated with the resolution of the viewport (i.e. 700 in FIG. 7). Using the dimension, the flyer image tiler 210 determines a first scaling factor ("$\beta_1$") for scaling the flyer image so that the entire flyer image fits within the determined dimension (i.e. 702 in FIG. 7).

The flyer image tiler 210 then determines the dimension associated with a resolution required to display the flyer image at sufficient detail (i.e. 704 in FIG. 7). For example, the flyer may contain fine prints that require a particular resolution for the viewer to be able to read the fine prints. Using this dimension, the flyer image tiler 210 is able to determine a second scaling factor ("$\beta_2$") for scaling the flyer image such that the image includes the requisite details at the most zoomed-in (i.e. blown up) state (i.e. 706 in FIG. 7).

The flyer image tiler 210 then determines the range ("R") between the first and second scaling factor (i.e. 708 in FIG. 7). For example, if $\beta_1=1$ and $\beta_2=12$, R=12 (i.e. $\beta_2/\beta_1$). In other words, the range is a factor of the available dimension of the viewport and the dimension of the original flyer image where sufficient level of detail can be seen.

The flyer image tiler 210 then generates a copy of the flyer image at each zoom level between the range, with each copy being segmented into tiles (i.e. 710 in FIG. 7). In one implementation, each zoom level is 2 times the previous zoom level (i.e. FIG. 8). In another implementation, the zoom level is flexible to allow the system to choose the most appropriate zoom ratio given the range and the number of zoom steps required (i.e. FIG. 9).

In the first implementation, the number of zoom steps is inflexible because each zoom level is 2 times the previous zoom level. In other words, the zoom ratio is 2 and the number of zoom steps is determined by this zoom ratio. To determine the number of zoom steps required, the system determines the smallest power of 2 that is equal to or greater than the range, which will be hereinafter referred to as $R_p$. For example, if the range required is 12, the system determines $R_p$ to be 16 ($2^4$). This means that 4 zoom steps (i.e. transition steps between 1×, 2×, 4×, 8× and 16×) are required to achieve a range of 12. Because 12 is not a power of 2, the system determines $R_p$, which serves to ensure that the system provides equal or greater level of detail. In this example, to achieve a range of 12 using a zoom level of 2, the system determines that minimum of 4 zoom steps are required.

Referring to FIG. 8, a tile set 800 for a given screen resolution is shown. With the given screen resolution, the flyer image tiler 210 determines the available screen dimension (i.e. height and width) and determines the scaling factor (i.e. $\beta_1$) required to fit the entire flyer image within the screen of the communication device.

The flyer image tiler 210 then determines the resolution that is required to display the flyer image at sufficient detail. This resolution allows the flyer image tiler 210 to determine the required dimension to show the flyer at the required level of detail, for example to read the fine prints. Using the required dimension, the flyer image tiler 210 determines the scaling factor (i.e. $\beta_2$) required to scale the flyer image to show sufficient detail. Thereafter, the flyer image tiler 210 determines the range R between $\beta_1$ and $\beta_2$, and $R_p$. Using the numbers from the above example, $\beta_1$=1 and $\beta_2$=12, the system determines R=12 and $R_p=2^4=16$. Therefore, the tile set 800 includes 4 steps or 5 zoom levels (i.e. 4 transition steps between 1×, 2×, 4×, 8× and 16× zoom levels).

Alternatively, or additionally, the flyer image tiler 210 may retrieve or receive a list of common resolutions of viewer's screens (e.g. 1920 by 1080, 1280 by 800 and 1024 by 768) and determine the scaling factor (i.e. $\beta_1$) to fit the flyer image within each of the common resolution in the list. Thereafter, for each common resolution in the list, the system may generate multiple copies of the flyer image at each zoom level, with each copies of the flyer image being segmented into tiles. The flyer image tiles for each common resolution makes up a tile set. For example, in FIG. 3, there are three sets of flyer image tiles for three different screen resolutions.

In the second implementation, the number of zoom steps is flexible, with each zoom level not being necessarily twice the previous zoom level. In other words, the zoom ratio is not necessarily 2. Using the above example, using flexible zoom level, the system is able to provide exactly the required range of 12. After determining the required range, the system determines the appropriate zoom steps ("S") to transition from viewing the full flyer within the viewport to viewing the flyer at the finest detail level. In this example, assume that the system determines S to be 3. Thus, the zoom ratio may be calculated using the following formula: $Log_x(R)=S$, where X is the zoom ratio. Using the numbers from the current example, with $Log_x(12)=3$, the system determines the zoom ratio to be 2.29. The resulting zoom levels for the 3 zoom steps are then 1×, 2.29×, 5.24× and 12×, as shown in FIG. 9. Similarly to the first implementation, the system may generate a plurality of tile sets 910 of the flyer image 912 where the system retrieves or receives a list of common resolutions.

Moreover, in both the first and second implementation, after determining the zoom ratio or zoom steps, there may be a review process to add or eliminate one or more zoom levels. The review process analyzes the generated copies of the tiled flyer image at the plurality of zoom levels to ensure that the zoom steps between the zoom levels are appropriate for the viewer. Referring to the first implementation above, after the review process, it may be determined that zoom level 8× does not add much value to the range in the flyer image tile set, and thus, the flyer image tiles at zoom level 8× may be eliminated. Thus, only 3 zoom steps or 4 zoom levels would exist—i.e. 1×, 2×, 4×, and 16×. The same can be applied to the second implementation, or any other implementation. In the second implementation, it may be determined that because of the content in the flyer image, zoom level 2.29× is redundant or unnecessary. In such a case, the flyer image tiles in the zoom level 2.29× may be eliminated, resulting in only 2 zoom steps or 3 zoom levels: 1×, 5.24× and 12×. Conversely, it may be determined that the jump from 5.24× to 12× may be too steep after the review process. In such a case, an intermediate zoom level may be added. For example, a halfway zoom level between 5.24× and 12× (i.e. 8.62×) may be added to improve the viewer's browsing experience. Thus, after the analysis, the system may remove one of the copies of the tiled flyer image from the flyer image tile set that corresponds to one of the plurality of zoom levels. Conversely, the system may add a new copy of the tiled flyer image into the flyer image tile set corresponding to a new zoom level that is absent from the plurality of zoom levels.

Figures 11A, 11B:
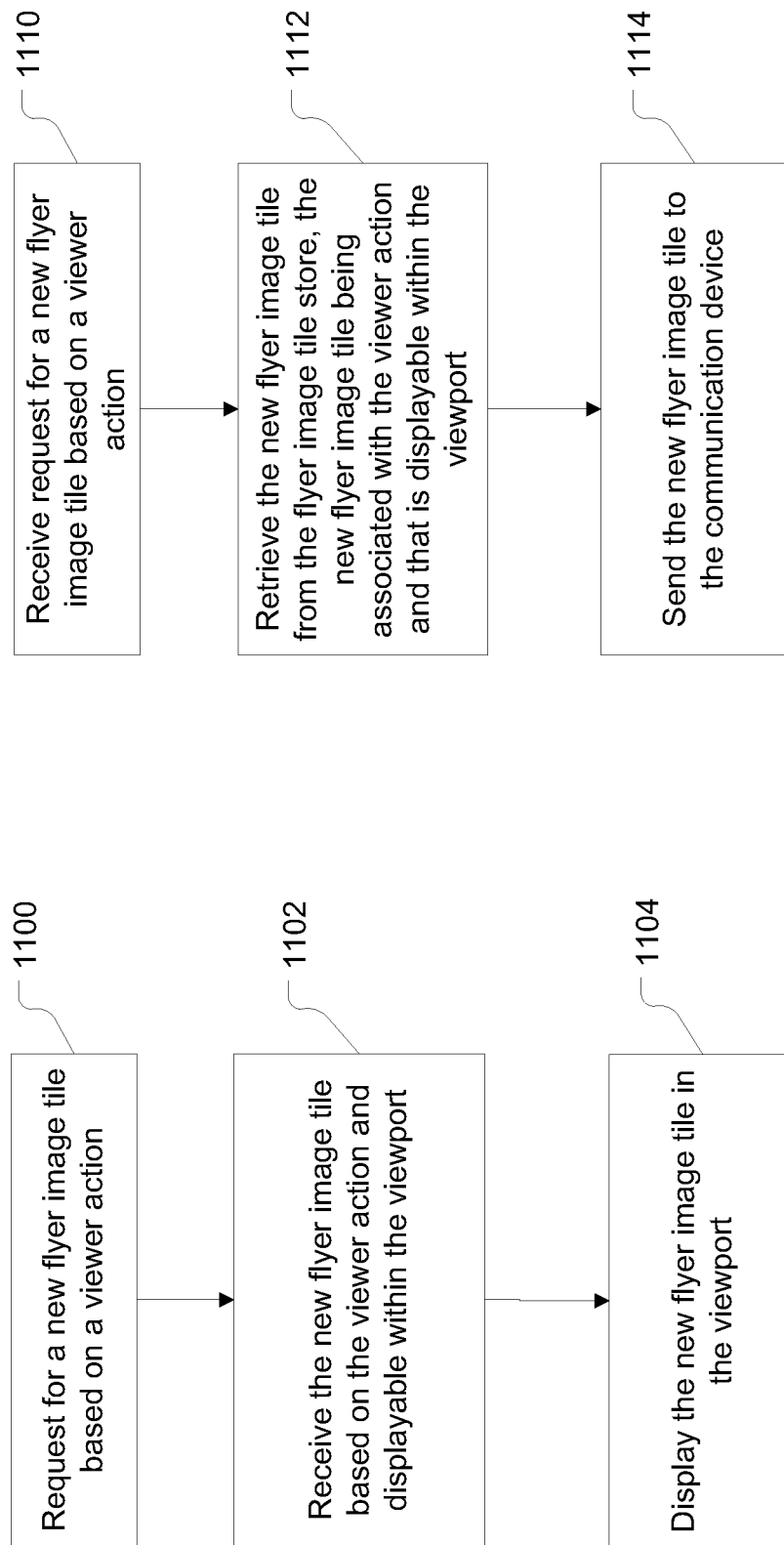
FIG. 11A depicts a process for a communication device for requesting and receiving a flyer image tile based on viewer action.
FIG. 11B depicts a process for an interactive flyer system for responding to a request as described in FIG. 11A.

Thus, the communication device (e.g. 106 in FIG. 1) communicates with the interactive flyer system 200 to display an interactive digital flyer. Referring to FIGS. 10 and 11, the communication device requests for an interactive digital flyer at an initial zoom level, with the request comprising device information of the communication device (i.e. 1000 in FIG. 10A). For example, the device information may include viewport information such as viewport size and resolution. It will be understood that device information may include more than viewport information such as information related to the device such as locale information, IP address, and other device related information that may be used by the interactive flyer system 200. The interactive flyer system 200 receives the request for the digital flyer at the initial zoom level (i.e. 1010 in FIG. 10B) and retrieves from a flyer image tile store (e.g. 220 in FIG. 2) a flyer image tile within a flyer image tile set (i.e. 1012 in FIG. 10B). As discussed in the disclosure, the flyer image tile set includes multiple copies of the flyer image segmented into tiles with each copy representing the flyer image at a zoom level. Since the flyer image tile at the initial zoom level was requested, the flyer image tile set associated with the resolution of the viewport of the communication device is selected. Thereafter, the flyer image tile, within the flyer image tile set, representing the most zoomed-out view configured to fit within the viewport of the communication device is retrieved. After retrieval, the flyer image tile retrieved is sent and received by the communication device (e.g. 1002 and 1014 in FIGS. 10A and 10B, respectively). The received flyer image tile is then displayed in the viewport of the communication device (i.e. 1004 in FIG. 10A).

In addition to retrieving the flyer image tile, the system 200 may retrieve flyer-related information associated with the flyer. For example, the flyer-related information may be contextual information defined through polygon mapping, as it will be discussed below. Moreover, flyer-related information may be point of interest, product specific or feedback information. Details relating to flyer-related information will be further described below.

After the communication device displays the digital flyer at the initial zoom level, the viewer may perform a viewer action, such as zoom or pan. Based on the viewer action, the communication device may further request for a new flyer image tile to be displayed in the viewport of the communication (i.e. 1100 in FIG. 11A), with the request comprising device information. In one implementation, the device information may include viewport information such as the location coordinates and the zoom level of the viewport (i.e. information from the geometry layer). Upon receiving the request for the new flyer image tile (i.e. 1110 in FIG. 11B), the system 200 retrieves from the flyer image tile store 220 flyer image tile that is associated with the viewer action and displayable within the viewport of the communication device (i.e. 1112 in FIG. 11B). The received new flyer image tile is then displayed in the viewport of the communication device (i.e. 1104 in FIG. 11A).

Additionally, the system may retrieve a flyer image tile that is not yet displayable in the viewport of the communication device but to be cached at the communication device for future retrieval. By pre-emptively caching flyer image tile(s) not yet displayable in the viewport but may soon be requested, performance is improved at both the communication device and the interactive flyer system. Given the structure of the interactive flyer, caching may be based on the information included therein to increase the hit rate of the cache. For example, caching may be based on the feedback information included in a feedback store, the device information included in the request, or flyer-related information included in a flyer data store. After retrieval, the flyer image tile(s) is sent and received by the communication device to be displayed or cached at the communication (i.e. 1102 and 1114 in FIGS. 11A and 11B).

Context Information—Polygon Mapping

Within the interactive flyer system 200, a system for contextualizing the interactive flyer is disclosed. The system may comprise of a polygon mapping module 230 and a flyer data store 240 as depicted in FIG. 2. While the present disclosure describes the polygon mapping module 230 and flyer data store 240 as being a subsystem of the interactive flyer system 200, it will be understood that it may be implemented as a single system or as a separate and distinct system (e.g. external to the interactive flyer system 200). It will also be understood that the system for contextualizing the interactive flyer may be distributed across several systems. For example, the flyer data store 240 may be part of the interactive flyer system 200 while the polygon mapping module 230 may be separately implemented.

Figure 12:
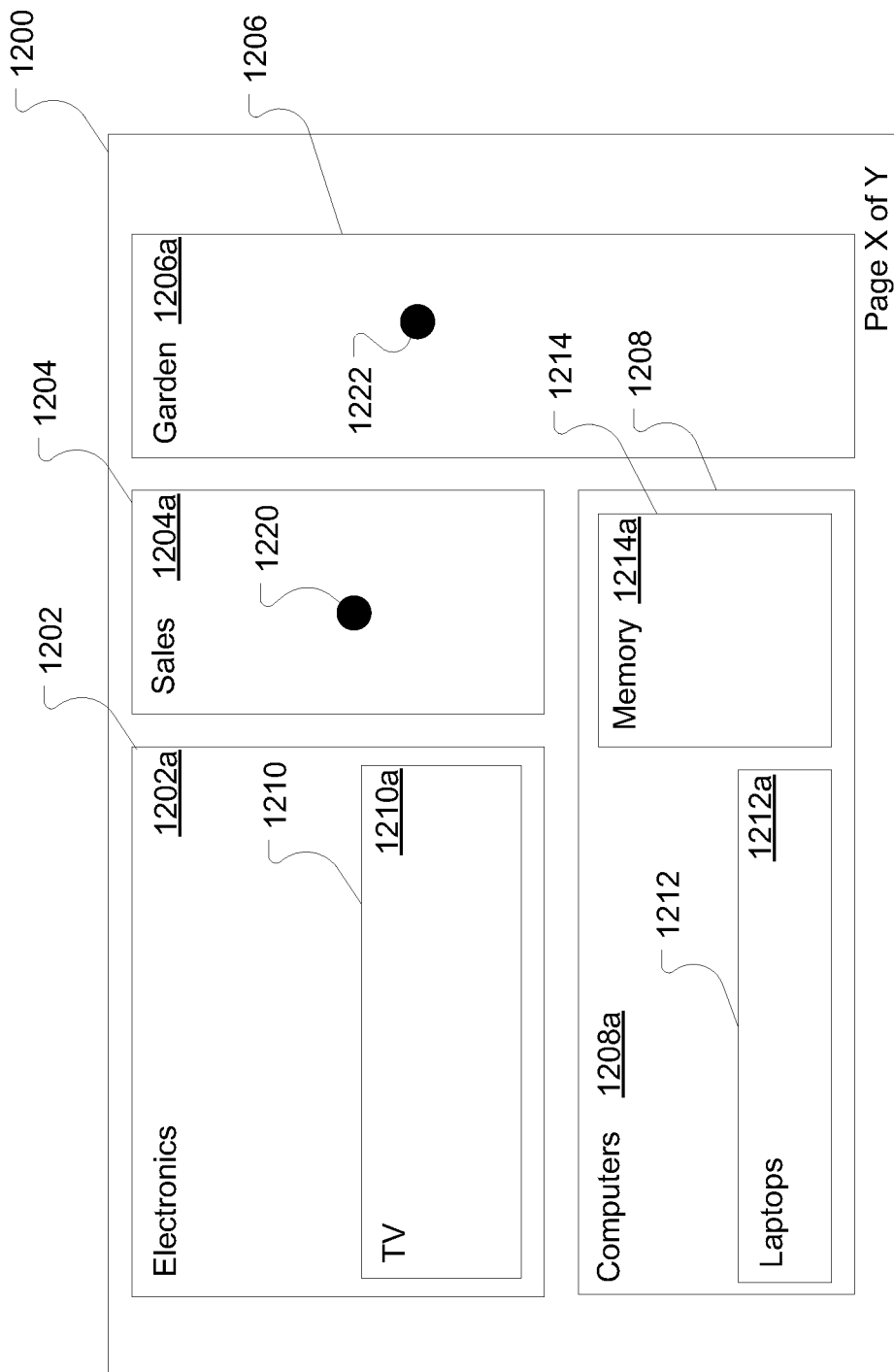
FIG. 12 shows a flyer image contextualized through polygon mapping according to an embodiment of the present technology.
Figure 13:
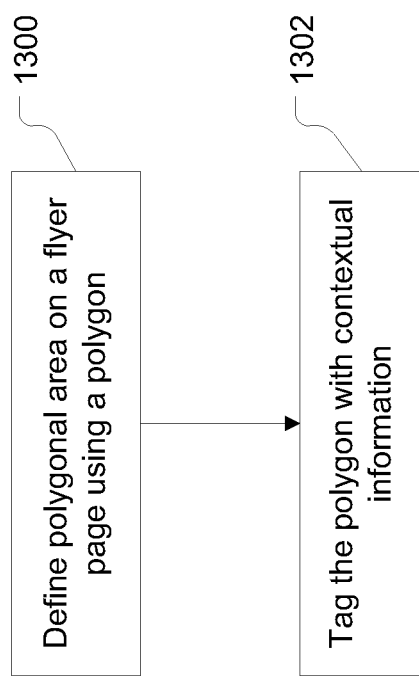
FIG. 13 illustrates a process for contextualizing a flyer image using polygons.

Now also referring to FIGS. 12 and 13, a system for contextualizing an interactive flyer is disclosed. The system includes a polygon mapping module 230 for contextualizing the interactive flyer. To incorporate contextual information into the interactive flyer, the polygon mapping module 230 may use polygon mapping information that includes at least one polygon for defining a polygonal area on the source flyer image representing one or more pages of the digital flyer. Thereafter, the polygon(s) is tagged with the contextual information. In other words, the polygon mapping module 230 defines the polygonal area on a flyer page using a polygon and tags the polygon with contextual information (i.e. 1300 and 1302 in FIG. 13). It will be understood that source flyer image generally refers to the underlying image source for the interactive digital flyer. In one embodiment, the source flyer image may be a non-tiled image representing the digital flyer. In another embodiment, the source flyer image may include a flyer image tile set as discussed above and exemplified in FIG. 3.

In one embodiment, the polygon mapping module 230 may include an interface that allows a publisher, vendor or viewer to define the polygons and tag the polygons with the contextual information. For example, the publisher may prepare the interactive digital flyer using the information given from the vendor, including incorporating contextual information through the polygon mapping module 230. In another embodiment, after the publisher prepares the interactive digital flyer, the vendor may then incorporate the contextual information through a vendor-only portal. In a further embodiment, viewers may be crowdsourced to define the polygons using the polygon mapping module 230. In an even further embodiment, the polygon mapping module 230 may automatically define and tag the polygons based on predetermined information. This predetermined information may be provided by the vendor based on an agreed format of the digital flyer or may be based on feedback information from a feedback data store (e.g. 250 in FIG. 2).

Additionally, the interface of the polygon mapping module 230 may allow the publisher, vendor or viewer (e.g. crowdsourced) to define a point of interest on the digital flyer. A point of interest is an indication on the digital flyer intended to draw the viewer's attention. For example, it may point out popular items, severely discounted products or a product promoted by the vendor. Alternatively, or additionally, the point of interest may also be defined by the polygon mapping module 230 based on predetermined information as discussed above.

With polygon mapping information, the interactive flyer may be contextualized without individually tagging or labelling the items in the interactive flyer. Rather, polygonal area may be used on the flyer page to convey contextual information that conveys categorical or sectional information such as "Electronics" and "Computers" as shown in FIG. 12. This greatly reduces the time it takes to give meaning to the content included in a digital flyer. However, it will be understood, and will be further described below, that the polygons may be used to define polygonal areas at finer granular level, such as product or item level. This polygon mapping information may be stored in the flyer data store 240.

In FIG. 12, there is shown a flyer page 1200 that has been contextualized using the polygon mapping module 230. As shown, there are "top-level" polygons 1202, 1204, 1206 and 1208. The reference to "top-level" polygon refers to polygons that are not contained in any other polygon. While the polygons in FIG. 12 are generally rectangular in shape (i.e. four sides), it will be understood that polygons may take other forms having any number of sides, so long as the sides form a closed circuit to define an area (i.e. a polygonal area). For ease of illustration, polygon mapping in the present disclosure will be described with polygons having four sides.

Each of the "top-level" polygons defines a polygonal area 1202a, 1204a, 1206a and 1208a, which demarcates a section of the flyer page 1200 as having a particular contextual relationship. In FIG. 12, each of the "top-level" polygons have been tagged as "Electronics", "Sales", "Garden" and "Computer", which signifies that the items contained within those polygonal area all relate to "Electronics", "Sales", "Garden" or "Computers". Furthermore, sub-relationships may be defined by using overlapping polygons, such as polygons 1210, 1212 and 1214. In this particular example, the sub-level polygons 1210, 1212 and 1214 have been tagged with the labels "TV", "Laptops" and "Memory". Thus, within the polygonal area 1210a, 1212a and 1214a, the items contained therein will be one of "TV", "Laptops" or "Memory".

In addition to the polygons, the polygon mapping module 230 may define points of interests, such as points of interests 1220 and 1222. These points may be anything that may be of interest to the viewer such as special discounts, popular items, new items, items like-minded viewers found interesting, and other interesting information.

Once the polygons are defined using the polygon mapping module 230, the system is able to provide feature-rich information including hierarchical information, enhanced navigation aids, improved caching, comprehensive feedback and other information previously not available in a digital flyer. In one embodiment, the interactive flyer system may generate navigational information using the polygons. The navigational information may be in the form of a table of content, or a navigational strip, or both. In other embodiments, the polygons may be used to generate feedback information, to better predict caching, and to interlink between related flyers. Some of the embodiments will be described below.

Figure 14:
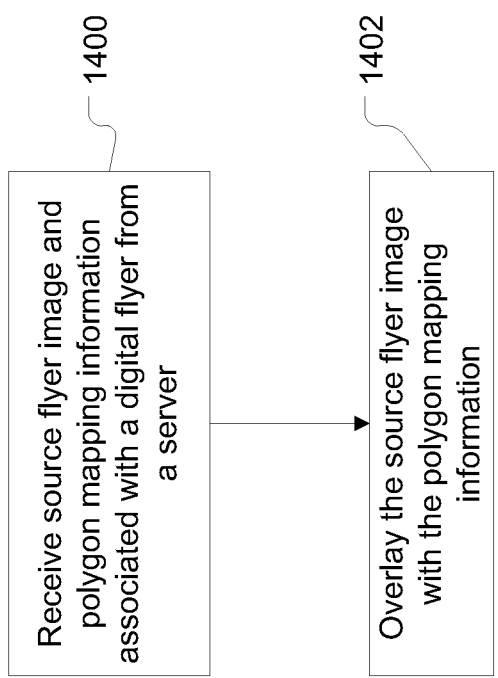
FIG. 14 illustrates a process for displaying a digital flyer with contextual information.

Thus, the communication device communicates with the interactive flyer system 200 to display a digital flyer with contextual information. Referring to FIG. 14, the communication device receives a source flyer image and polygon mapping information associated with a digital flyer from a server (i.e. 1400 in FIG. 14). As previously mentioned, the source flyer image may be a non-tiled flyer image or a flyer image tile set as shown in FIG. 3. The polygon mapping information refers to polygons used to define a polygonal area on the source flyer image, with each polygon being tagged with contextual information. This polygon mapping information is overlaid on the source flyer image (i.e. 1402 in FIG. 14). For example, the polygon mapping information may be included in a data layer (e.g. 304 in FIG. 3) of the digital flyer. Generally, the polygon mapping information is not shown on the flyer page but rather used to enrich the viewer's experience by generating, for example, navigational information or related information. However, it will be understood that the polygon mapping information may be shown to the user overlaid on top of the flyer page. In such a case, the flyer page may appear similar to flyer page 1200 as shown in FIG. 12.

In addition to receiving the polygon mapping information, the communication device may further receive point of interest information associated with the digital flyer from the server. Similarly to the polygon mapping information, point of interest information may be overlaid over the source flyer image and shown or not shown in the viewport of the communication device.

With the polygon mapping information and point of interest information, the communication device is able to display the digital flyer with feature-rich information. Such feature-rich information may include navigational information and related information as it will be described below. Moreover, the polygon mapping information and the point of interest information may be used in conjunction with feedback information to improve the efficiency and data accuracy by the interactive flyer system.

Navigational Information—Table of Contents

Figure 15:
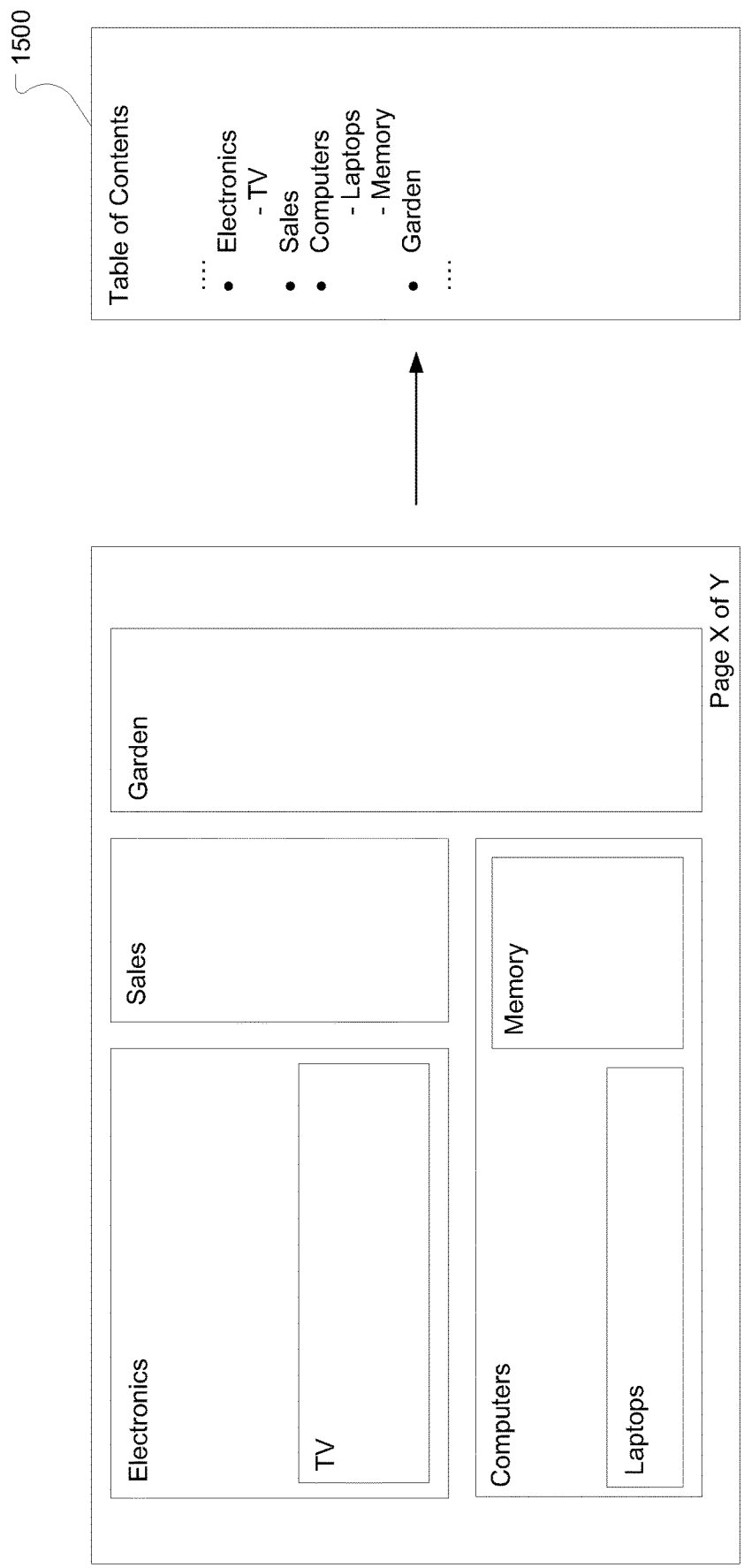
FIG. 15 illustrates an embodiment of navigational information generated using polygon mapping.

One embodiment of navigational information that may be generated using the polygons is a table of content 1500 as shown in FIG. 15. Instead of manually creating a table of content by linking an entry in the table of content with a particular flyer page, the interactive flyer system according to an embodiment of the present technology is able to auto-generate the table of content using the polygon mapping information. This is achieved by analyzing the spatial position and inclusion relationship of the polygons to understand the hierarchical relationship of the polygonal areas defined by the polygons.

Figure 16:
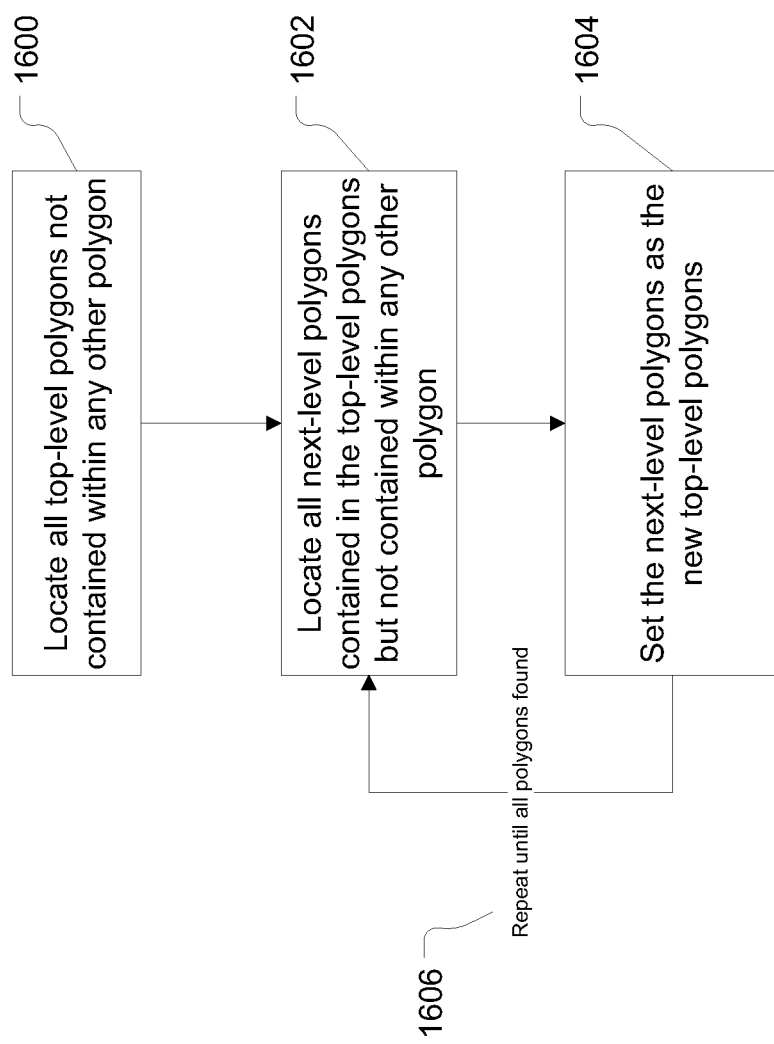
FIG. 16 shows a process for generating the embodiment as shown in FIG. 15 using the polygon mapping information.

In FIG. 16, there is shown one exemplary method for auto-generating the table of content. To generate the table of content 1500, the interactive flyer system looks through the inclusion relationship of the polygons. It first finds all the top-level polygons not contained within any other polygons (i.e. 1600 in FIG. 16). In FIG. 12, the top-level polygons would include polygons tagged as "Electronics", "Sales", "Computers", and "Garden". Thereafter, the system finds all the next-level polygons contained in the top-level polygons found at 1600 but otherwise not contained within any other polygon (i.e. 1602 in FIG. 16). Referring again to FIG. 12, these next-level polygons would include polygons tagged as "TV", "Laptops", and "Memory". The system then sets the next-level polygons as the new top-level polygons (i.e. 1604 in FIG. 16) and repeats locating all the next-level polygons until all the polygons are found (i.e. 1606 in FIG. 16).

With the generated table of content, the flyer viewer would be able to quickly jump to the flyer page containing the polygon. Various implementations are possible for showing the appropriate section of the flyer page. In one embodiment, the selected entry of the table of content may be shown by zooming into the associated polygonal area. For example, when the viewer clicks on "TV" in the table of contents 1500, the system may serve the flyer page zoomed into the "TV" polygon. In another embodiment, the selected entry of the table of content may be shown with the associated polygonal area highlighted. Continuing with the above example, instead of zooming into the "TV" polygon, the whole flyer page may be shown with the "TV" polygonal area highlighted.

Navigational Information—Navigation Strip

Figure 17:
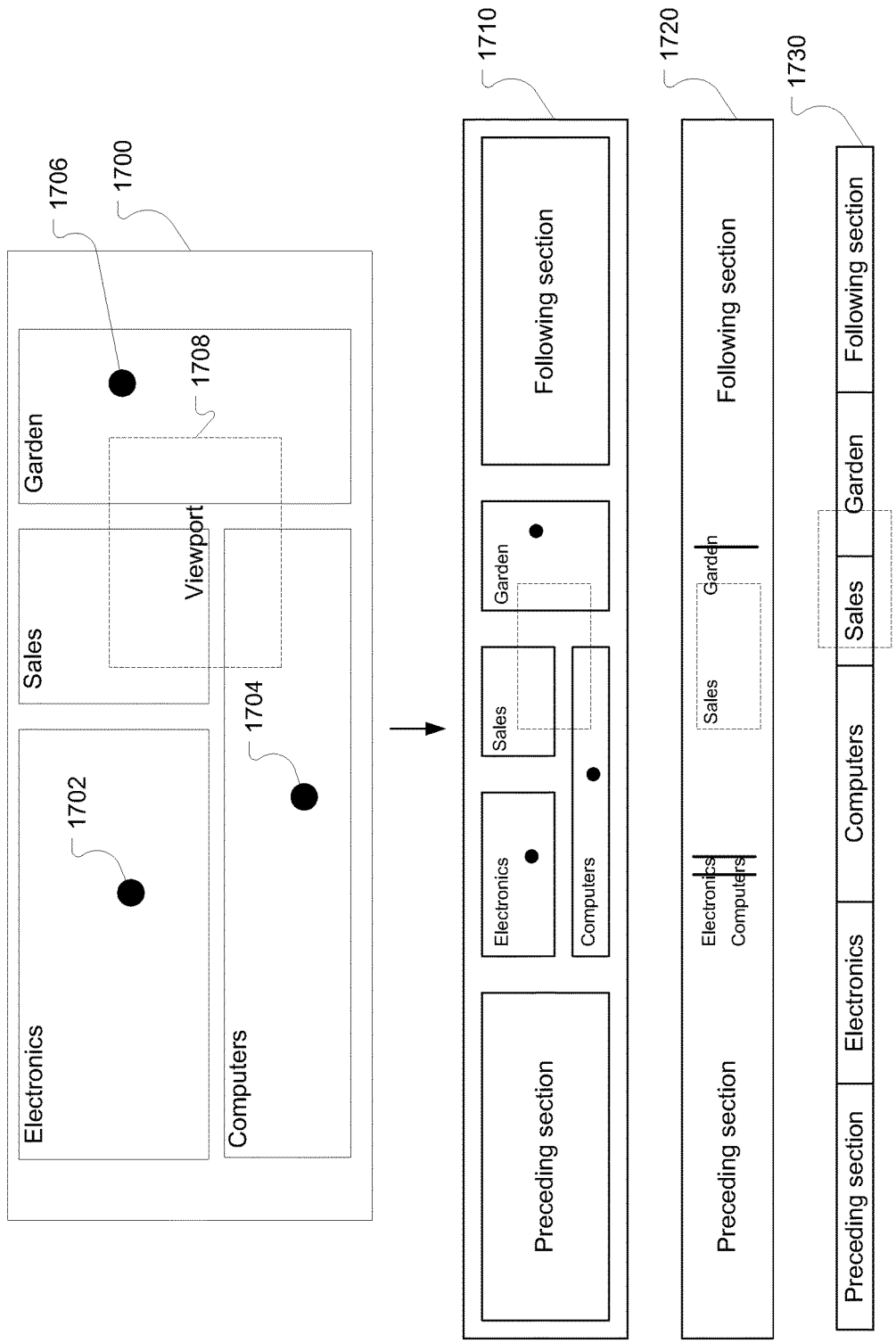
FIG. 17 illustrates another embodiment of navigation information generated using polygon mapping.

Another embodiment of the navigational information may be in the form of a navigation strip, several types of which are shown in FIG. 17. The navigation strip is an aid that helps the viewer navigate through the entire flyer. However, unlike a geographic mapping application, a mini-map type of navigation aid that consists of small zoomed-out versions of the flyer page is not beneficial to a viewer of digital flyers. The reason is that a flyer page typically contains numerous items with pictures and text that are hard to read when scaled down. A navigation strip (or may also be referred to as a "legend") that consists of scaled down versions of the full flyer page would thus fail to convey any meaningful information to the viewer. Rather, in the present technology, the interactive flyer system uses the polygon mapping information to generate a navigation strip that contains contextual information in compact form. Three possible implementations of the navigation strip will now be described.

In FIG. 17, there is shown a flyer page 1700 simplified to show only the top-level polygons tagged with the labels "Electronics", "Sales", "Computers", and "Garden". In the polygons labelled "Electronics", "Computers" and "Garden", there is further included a point of interest 1702, 1704, 1706. The point of interest may convey information about a particular item such as discounts at 50% off or $50 off. It may also serve to highlight information that may be of particular interest to the viewer. To better illustrate the functioning of the navigation strip 1710, 1720 and 1730, the current viewport 1708 of the communication device being used to browse the flyer is also shown in FIG. 17.

The first implementation of the navigation strip is a directly proportional navigation strip 1710 in FIG. 17, which comprises of to-scale rendering of the flyer sections. However, instead of the strip including scaled down versions of the flyer page, each section may be replaced with a solid colour (in FIG. 17, the solid colour is white for clarity; however, other colours may be used) and may include the title of each section (e.g. the contextual information used to tag the polygon). Where the flyer page includes points of interest, the navigation strip may also show the approximate locations in the navigation strip. In effect, the navigation strip 1710 conveys contextual information in the most true to position and to-scale format without simply using scaled-down images of the flyer page 1700.

Figure 18:
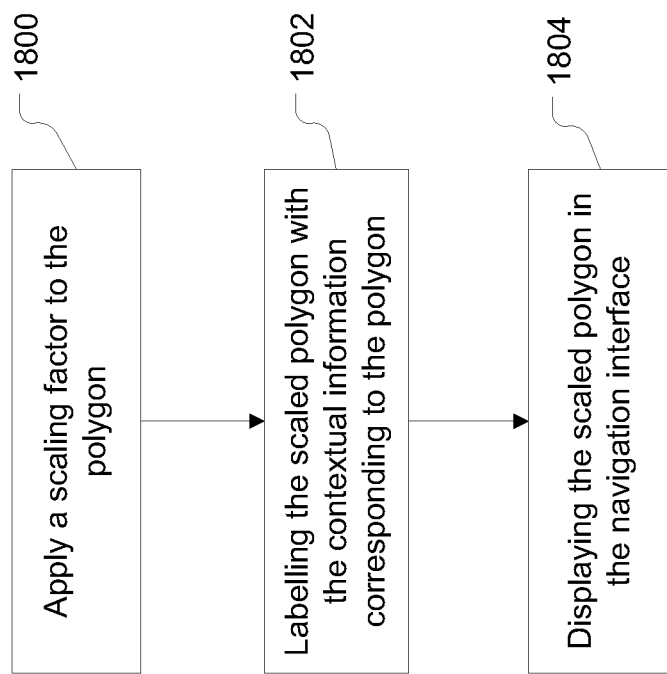
FIG. 18 shows a process for generating one of the embodiments as shown in FIG. 17 using the polygon mapping information.

One method to create the directly proportional navigation strip 1710 is illustrated in FIG. 18. To create the strip, the polygons are first scaled down by applying a scaling factor (i.e. 1800 in FIG. 18). While the same scaling factor may be applied to x and y axis of the polygons, it is to be understood that different scaling factors may be used. This has the advantage of optimizing the screen space occupied by the navigation strip 1710. In one embodiment, the scaling factor for the x-axis may depend on the width of the polygon and the length of the associated label, and the scaling factor for the y-axis may depend on the height of the polygon. Optionally, prior to applying the scaling factor, the polygons may be aligned along a grid to produce a more organized appearance. The scaled down polygons are then labelled with the contextual information corresponding to the contextual information of the polygon (i.e. 1802 in FIG. 18). For example, where the polygon is tagged with the label "Electronics", the system extracts this contextual information and labels the scaled polygon accordingly. Thereafter, the scaled down polygons are displayed in the navigation interface (i.e. 1804 in FIG. 18). In one implementation, the navigation interface may be located below the flyer page 1700, which may be hidden when not in use. In another implementation, the navigation interface may be located to the side of the flyer page 1700, for example to display the table of content.

Additionally, where the flyer page includes points of interest, they may be plotted using the scaling factor as reference. In a further embodiment, the current viewport information may be displayed on the navigation strip 1710 using the same scaling factor. Additionally, as the viewer changes the viewport, the navigation strip 1710 may change position (e.g. scroll) to maintain perspective and context of the flyer page.

A second implementation of the navigation strip is a text-only proportional navigation strip 1720 in FIG. 17. This navigation strip is a variation of the directly proportional navigation strip 1710 but one that requires less vertical space. In summary, the text-only proportional navigation strip 1720 is a vertically compressed version of the directly proportional navigation strip 1710 that compresses the y-axis while maintaining the proportion along the x-axis.

Figure 19A:
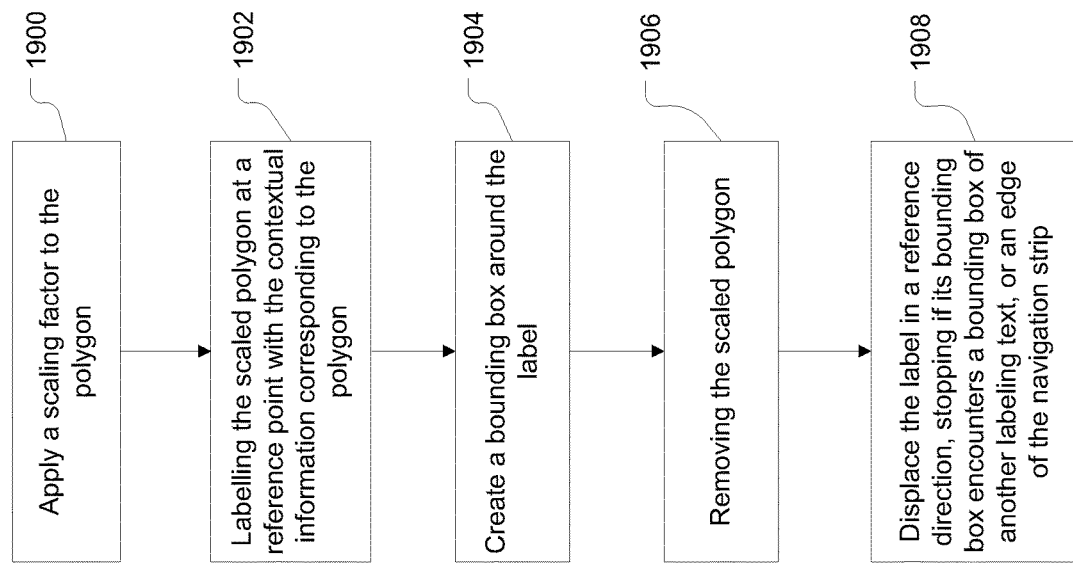
FIG. 19A shows a process for generating one of the embodiments as shown in FIG. 17 using the polygon mapping information.
Figure 19B:
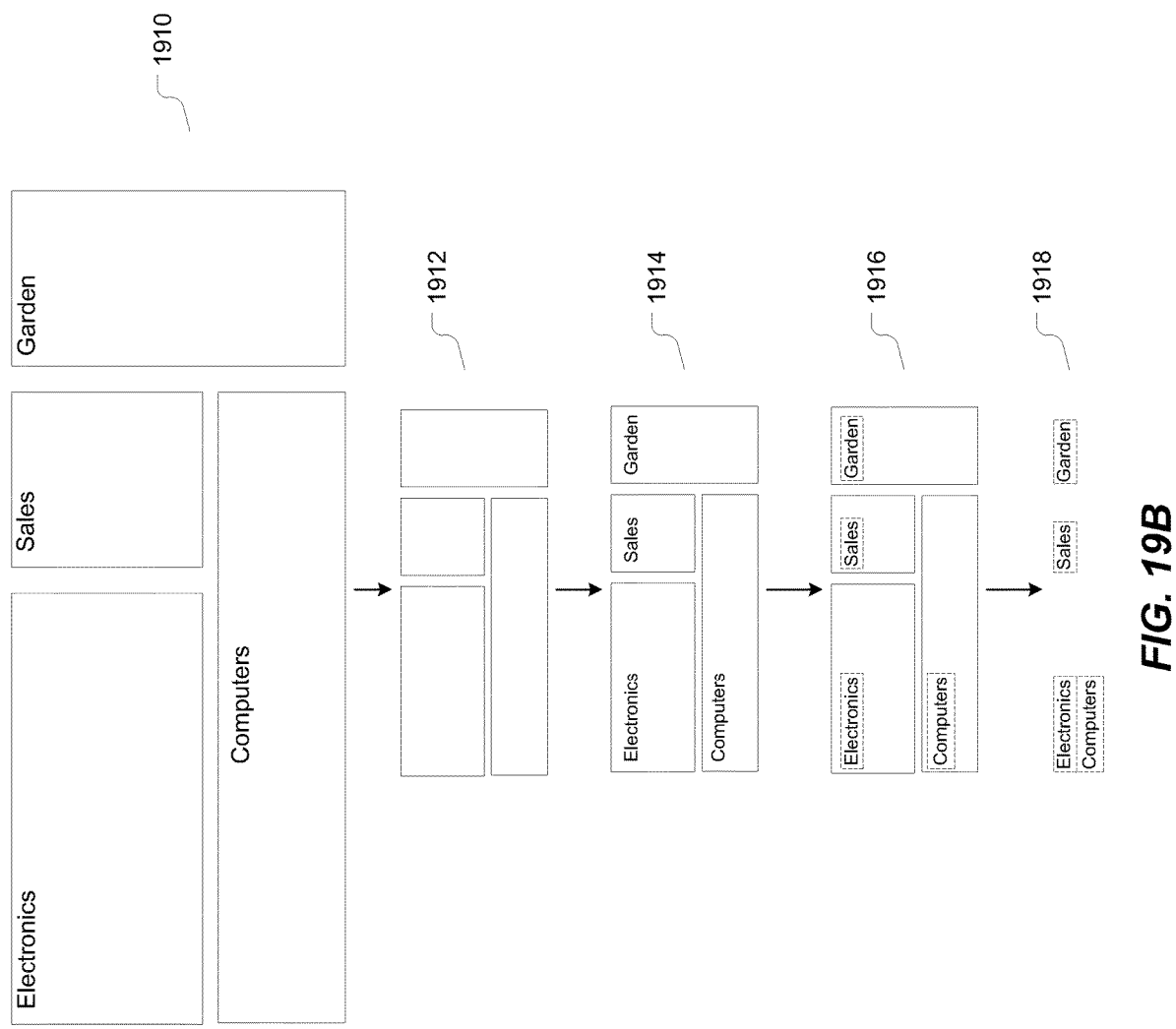
FIG. 19B shows the visual representation of the process in FIG. 19A.

One method of creating the text-only proportional navigation strip 1720 is an extension of the method for creating the directly proportional navigation strip 1710 as discussed above and depicted in FIG. 18. Referring to FIGS. 19A and 19B, a scaling factor is applied to the polygon (i.e. 1900 and 1912 in FIGS. 19A and 19B, respectively). However, unlike FIG. 18, the scaling factor for the x and y-axis need not be different to optimize the screen space occupied by the navigation strip. This is because the vertical space will be compressed subsequently and only the proportion along the x-axis will be maintained. Optionally, as discussed above, prior to applying the scaling factor, the polygons may be aligned along a grid to produce a more organized appearance.

The scaled polygons are then labelled with the contextual information corresponding to the polygon, with the labels being positioned at a reference point of the polygons (i.e. 1902 and 1914 in FIGS. 19A and 19B, respectively). The reference point may be anywhere within the polygonal area defined by the polygon. Where the system language is English, the reference point may be the top left corner as shown in 1914 of FIG. 19B. Thereafter, a bounding box is created around the label (i.e. 1904 and 1916 in FIGS. 19A and 19B, respectively) and the scaled polygons are removed (i.e. 1906 in FIG. 19A). In text-only proportional navigation strip, the polygons are used to maintain proportion of the contextual information along the x-axis. The y-axis is compressed to reduce the vertical space occupied by the navigation strip. Finally, each label (and the bounding box) for each polygon is displaced in a reference direction, stopping if the bounding box of the labeling text encounters a bounding box of another labeling text or an edge of the navigation strip 1720 (i.e. 1908 and 1918 in FIGS. 19A and 19B, respectively). Again, the reference direction may in any direction; however, where the system language is English, the reference direction may be up as shown in FIG. 19B. By this displacement, the vertical space is compressed while still maintaining horizontal relationships among the flyer sections.

To complete the navigation strip, the interactive flyer system may add the points of interest. However, because of the lack of vertical space, the interactive flyer system may instead use a vertical line to indicate the approximate location of the points of interest. In another embodiment, parentheses may be inserted after the labeling text. For example, if the points of interest referred to a discount, the parenthesis may display "2 discounts", signifying that there are 2 discounts in the particular section. Finally, similarly to the directly proportional navigation strip 1710, the interactive flyer system may insert the current viewport information appropriately scaled.

Figure 20:
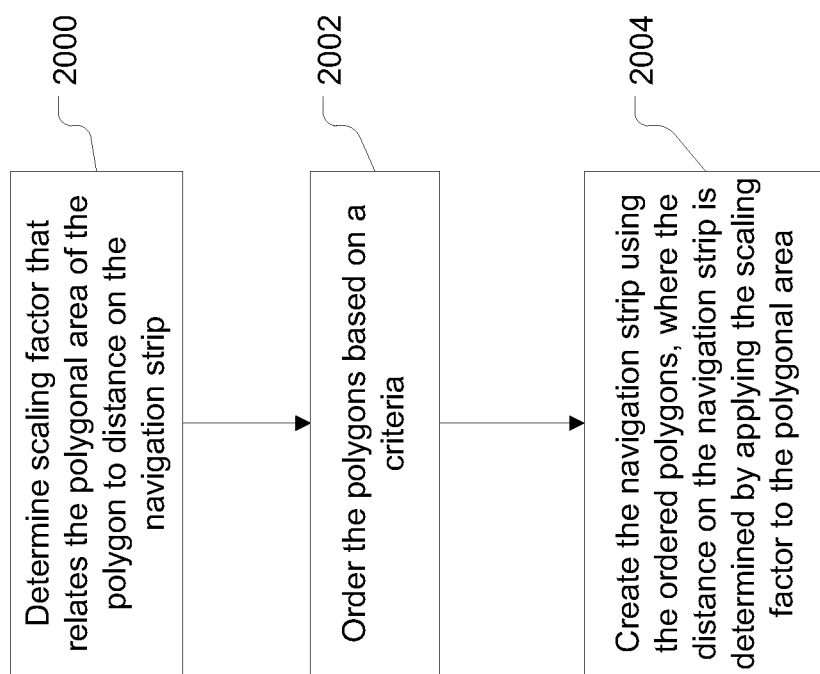
FIG. 20 shows a process for generating one of the embodiments as shown in FIG. 17 using the polygon mapping information.

The third implementation is the vertically most compact navigation strip, hereinafter referred to as area proportional navigation strip 1730 in FIG. 17. It involves transforming the 2D polygonal areas defined by the polygons into a 1D navigation strip. FIG. 20 illustrates one implementation of performing such transformation.

In the exemplary implementation, the system determines the scaling factor that relates the polygonal area defined by the polygon to the distance on the navigation strip (i.e. 2000 in FIG. 20). In this particular example, the area proportional navigation strip 1730 is horizontal in direction; however, it is to be understood that the 1D navigation strip may be vertical in direction, or any other direction, in other implementations. Thus, the scaling factor translates the polygonal area occupied by the polygons into horizontal distance on the navigation strip 1730.

Thereafter, the polygons are ordered (i.e. 2002 in FIG. 20). There are various ways to order the polygons; however, where the system language is English, the following method may be used to order the polygons. Prior to ordering, the polygons may first be aligned along a grid to produce a more organized appearance. The interactive flyer system then creates a list of coordinates of each polygon, with the coordinate representing the top left most vertex of the polygon. The list is then ordered using the x-axis coordinate. Where there are two polygons with the same x-coordinate, the coordinates are ordered from top to bottom. For example, in the flyer page 1700 of FIG. 17, the polygons having labels "Electronics" and "Computers" have the same x-coordinate. In such a case, preference is given to "Electronics". When the polygons in FIG. 17 are ordered, the ordered list would appear as follows: electronics, computers, sales and garden.

To create the navigation strip 1730 (i.e. 2004 in FIG. 20), the interactive flyer system starts with the first polygon in the ordered list. To determine the amount of horizontal distance that should be allocated to the first polygon, the scaling factor is applied to the polygonal area of the first polygon. This process is repeated until all the polygons in the ordered list are converted. Finally, the viewport information may also be included in the navigation strip 1730 using the scaling factor.

While the navigation strip was described with three specific implementations, it will be understood that various other implementations may be possible.

Interlinking Related-Flyers and Integrating Related-Data

Contextual information conveyed through polygon mapping enabled the viewer to overview the entire flyer at a glance and to navigate to different sections of the flyer using the contextual information. For example, the table of contents generated by analyzing the hierarchical structure of the polygons allowed the interactive flyer system to quickly generate a flyer summary (e.g. table of contents). Further, the polygon mapping enabled the generation of navigational aids (e.g. contextual navigation strip) that conveyed meaningful and useful contextual information. In addition to these advantages, the polygon mapping may also allow the system to relate the contextual information of the flyer to information not contained in the flyer. For example, the related information may be from a flyer at a competing store, allowing the viewer to comparison shop. In a further example, the related information may be information that would be desirable to informed shoppers. Such information may include price history, product reviews, price comparison data not contained in other flyers, cross border prices, targeted advertising and offers, and many more.

The first type of related information derives from other flyers. By using the information from the polygon mapping, related information contained in other flyers can be easily associated. This allows flyer viewers to comparison shop between flyers very easily. One implementation for providing such related information will be discussed using FIGS. 21 and 22.

At 2100, the interactive flyer system retrieves all related digital flyers. Relevance may be based on a single factor or a combination of several factors. For example, the interactive flyer system may retrieve all the flyers within the same geographical area, or flyers from stores with online shopping. This "initial set" of flyers is then ordered based on relevancy, which may also be based on one or many factors (i.e. 2102 in FIG. 21). For example, the system may take into consideration the following: physical distance between the stores of the related flyers and the store of the current flyer or the viewer's location; brand awareness of the related flyers; previous preference or history of the viewer; behaviour history of other viewers; business relationships between the publisher of the flyer and the vendor; contextual similarities between the related flyers and the current flyer; store relationships (e.g. known competitors or affiliates); or any other factors.

Figure 21:
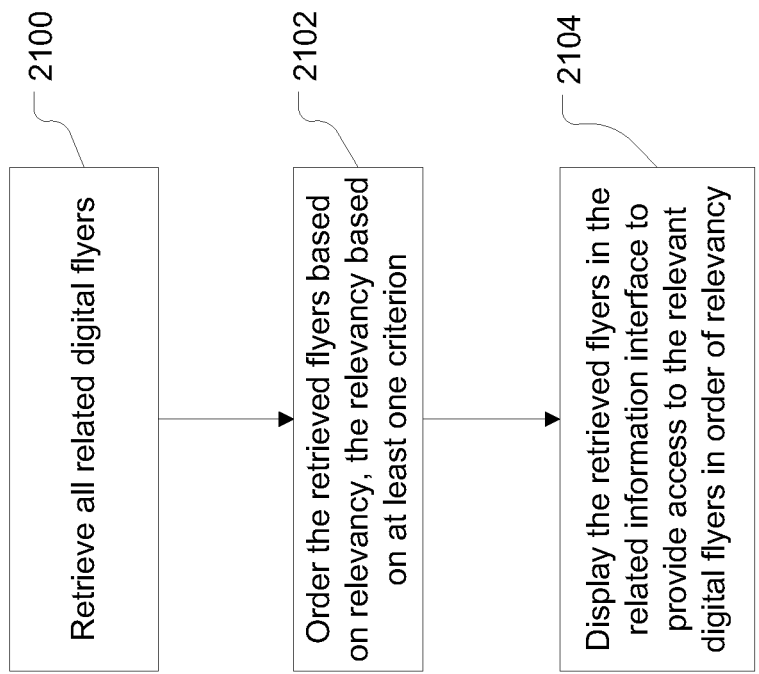
FIG. 21 illustrates a process for generating related information using contextual information contained in another related flyer.
Figure 22:
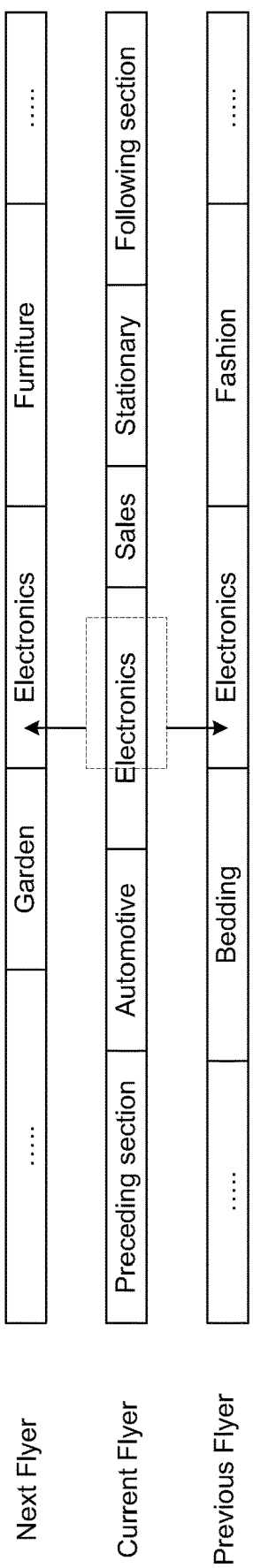
FIG. 22 illustrates the related information generated using the process in FIG. 21.

Once the retrieved flyers are ordered according to relevancy, the interactive flyer system displays the retrieved flyers in the related information interface to provide access to the relevant digital flyers in the order of relevancy (i.e. 2104 in FIG. 21). The interface may be a simple link to allow the viewer to switch to the most relevant flyer. A more advanced implementation is depicted in FIG. 22, which is an extension of the area proportional navigation strip (i.e. 1730 in FIG. 17) as described above. It will be understood that the interface may also be implemented using extensions of the directly and text-only proportional navigation strip (i.e. 1710 and 1720 in FIG. 17). In the particular implementation shown in FIG. 22, in addition to generating the navigation strip for the current flyer, the interactive flyer system also generates the navigation strip for the next most relevant flyer. This allows the viewer to jump from one flyer to another seamlessly. In this particular implementation, intra-flyer navigation (i.e. within the flyer) is achieved by moving horizontally (i.e. x-axis) and inter-flyer navigation (i.e. between flyers) is achieved by moving vertically (i.e. y-axis). The generated navigation strip is kept in memory so that inter-flyer navigation is possible not only to the next flyer but also to previously viewed flyers. Additionally, the relative position of the navigation strip of the next flyer may be changed depending on the position of the viewport. For example, if the center of the current viewport is within the polygon tagged as "Electronics", the position of the next flyer in the navigation strip may be changed such that its "Electronics" section is aligned with the current flyer, as shown in FIG. 22. The same may be applied to the related flyer previously shown. This dynamic positioning of the navigation strip of the next flyer and the previous flyer allows the viewer to immediately jump into the most relevant section.

The second type of related data stems from other data sources, outside of those contained in other flyers. Other sources may include public information (such as those available from the Internet), private information (such as those provided by partners) and sources other than flyers. This involves determining the interest of the viewer by analyzing different clues. For example, the interactive flyer system may infer the viewer's interest by determining how the current viewport intersects with the polygons, the position of the mouse cursor, zoom level or any other clues. Depending on the clues, the interactive flyer system may retrieve related data such as price comparison data, historical market pricing, cross-border comparisons, product details such as reviews, specifications and descriptions, and targeted advertisements and offers. The advantage is that such integration with other data sources is enabled without explicitly tagging individual items that appear on a flyer. Rather, the publisher only needs to convey contextual information using the polygons.

Moreover, depending on the extent of other data available, the interactive flyer system may provide the viewer with the functionality to filter the interactive flyer based on data available not only within the flyer but also based on the other data. For example, consider the scenario where a shopper is searching for good deals on flat screen TVs. The shopper opens the digital interactive flyer and places a filter to search for "TV" with discounts greater than 25% off. The interactive flyer system proceeds to highlight the sections of the interactive flyer according to the filter. According to a further embodiment of the present technology, the interactive flyer system may provide the viewer with the option to set filters that also takes into account data from other flyers and other non-flyer sources. For example, the interactive flyer system may retrieve other TV discounts from other sources (e.g. cross-border) that may be offer greater discount than those contained in the present flyer. Alternatively, or additionally, the interactive flyer system may retrieve price history of the products contained in the TV section by consulting its or other database. In effect, the interactive flyer system allows the viewer to set search filters on digital image-based flyers that are normally only reserved for text based search engines.

While the different types of navigational information and related information have been described separately, it will be understood that the interactive digital flyer system may incorporate one or more of such information within the same system. For example, interactive digital flyer may incorporate a table of content in a navigation interface and a navigational strip in another navigation interface. In another implementation, the interactive digital flyer may incorporate a table of content in a navigation interface and a modified text-only proportional navigational strip in a related information interface. It will be understood that numerous combinations of the navigational information and related information may be generated using the contextual information conferred by the polygon mapping information and other flyer-related information as discussed above.

Feedback System

Feedback systems may be generally categorized into explicit and implicit feedback systems. Explicit feedback refers to resulting actions of the viewer, while implicit feedback refers to the viewer behaviour leading to the resulting actions. For example, the viewer is presented with items 1-10. In coming to the decision of clicking on items 1 and 5, the viewer looks through items 1-5. An explicit feedback system would report back that the viewer clicked on items 1 and 5, while the implicit feedback system would report back that the viewer viewed items 1-5. Thus, an explicit feedback system is result oriented while an implicit feedback system is behaviour oriented. According to an embodiment of the present technology, implicit feedback is made possible for image based digital flyers. Using the feedback information, a host of features are made possible including predictive caching, dynamic generation of points of interests, and viewer interest maps.

One embodiment of a feedback system may be implemented by using the polygon mapping information stored in the feedback data store 250 as discussed above. Polygon mapping information includes one or more polygons that are used to define polygonal area(s), with each polygon being tagged with contextual information. The information conveyed by the tagged contextual information is dependent on the granularity of the polygon mapping information. In addition to the polygon mapping information stored in the feedback data store 250, the feedback data store 250 may also receive device information from the communication device, such as those shown in FIG. 1, periodically. The device information conveys information about the communication device and the viewer. For example, the device information may include information such as viewport information including viewport coordinates, date, time, session information, viewer information (such as IP address and locale information), information about the communication device (such as operating system and Internet browser information), or any other information. Using the device information, such as viewport coordinates (x1, y1) and (x2, y2) in FIG. 23A of viewport (e.g. 2300A in FIG. 23A), and the polygon mapping information, the system is able to generate detailed feedback report.

Figure 23A:
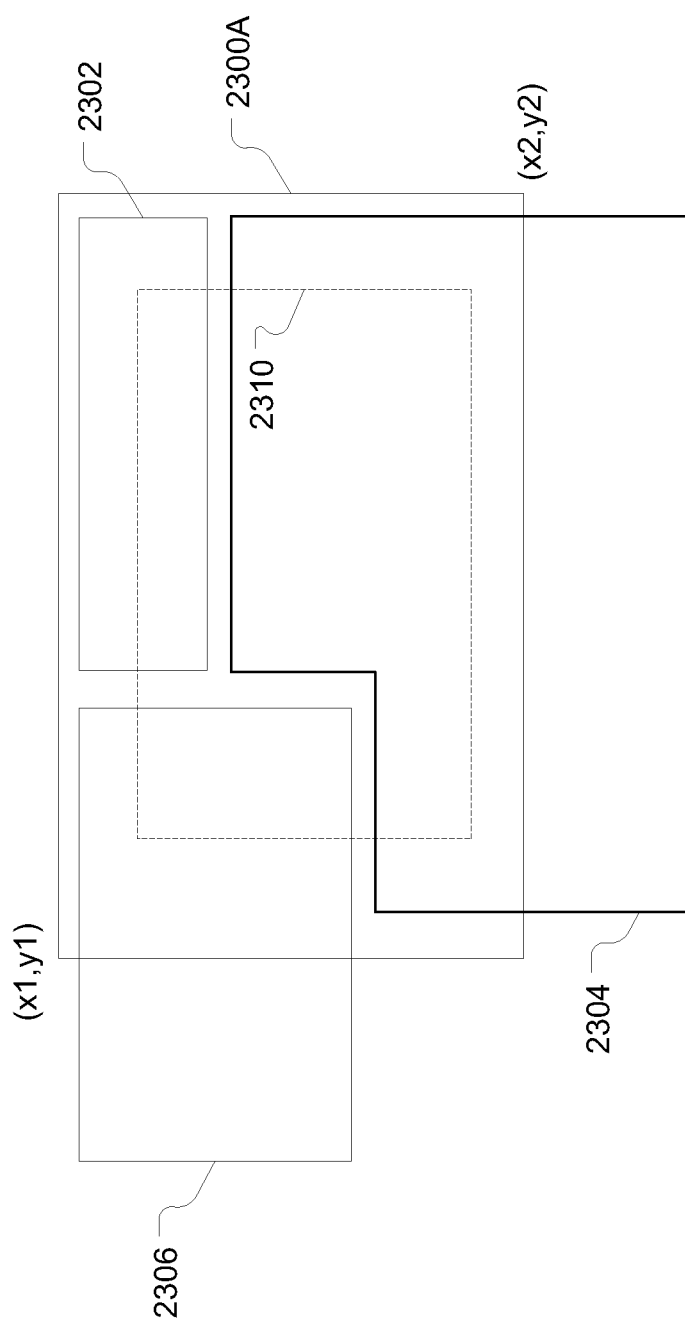
FIG. 23A illustrates a snapshot of a viewer's viewport constructed using device information and polygon mapping information according to an embodiment of the present technology.
Figure 23B:
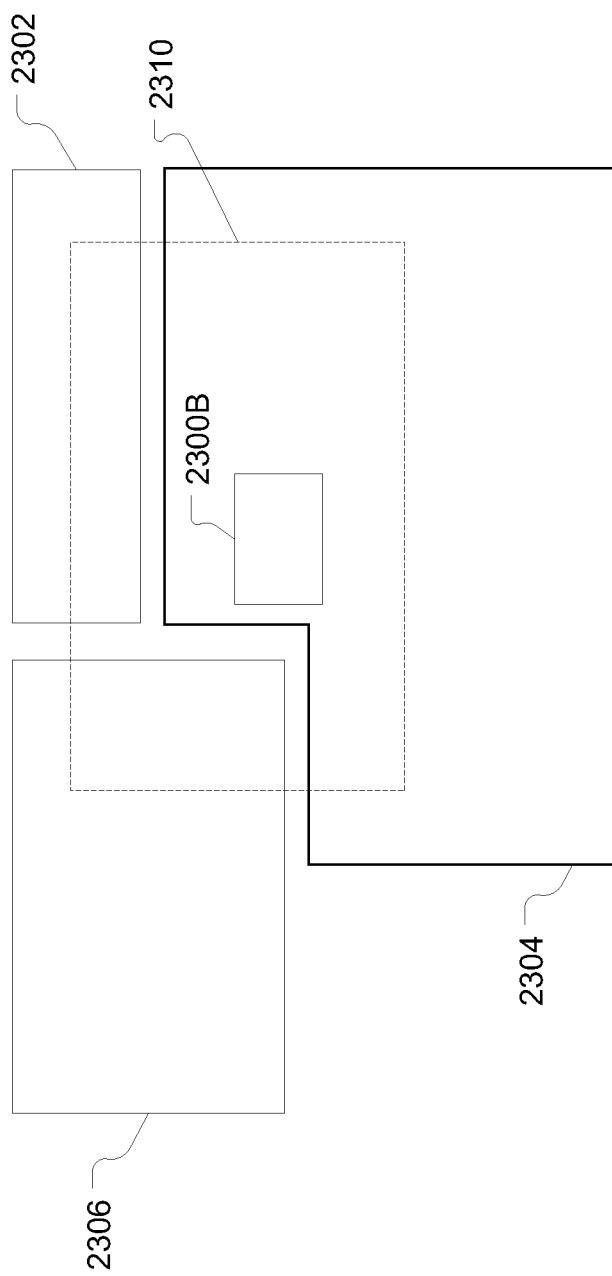
FIG. 23B illustrates the snapshot of FIG. 23A with an altered viewport size.

Referring to FIGS. 23A and 23B, an exemplary implementation for using feedback information stored in the feedback data store 250 and polygon mapping information stored in the flyer data store 240 to generate a feedback report will be discussed. It will be understood that a digital flyer may include one or more sets of polygon mapping information. One set may be used to generate navigational and related information as discussed above. Another set may be used to generate a feedback report. This has the advantage of conveying one set of information for the flyer viewer, while collecting and comparing another set of information for the vendor.

FIG. 23A shows the viewport information of viewport 2300 for a viewer at a particular point in time. This snapshot of the viewport is generated by referencing the device information (contained in the device information stored in the feedback data store 250) of the viewer at the particular point in time with the polygon mapping information stored in the flyer data store 240. The device information may be sent by the communication device, such as on a periodic basis, to the interactive flyer system 200 and stored in the feedback data store 250. Thus, for a given viewer, during a given session, there may be one or more such device information entries in the feedback data store 250, which can be used to construct the snapshot of the viewer's viewport at a particular point in time when the device information was sent. Using this information and other information contained in the device information, various feedback report may be generated using the device information from a single viewer, all the viewers or a selected group of viewers. For example, the device information may contain user-persona information derived from the HTTP header, which can identify information such as screen resolution, operating system, and browser type and version. Using this information, viewers may be grouped as "high-tech" viewers (e.g. viewers with large screen resolution, latest operating system and browser versions) or "office" viewers (e.g. viewers with standard business versions such as typical screen sizes and browsers as determined by the system, and viewing the digital flyer at business hours).

In one embodiment, the concept of pageview is used to generate a feedback report. Pageview refers to the number of views that a polygon received. As described previously, the polygon demarcates a polygonal area that conveys contextual information about products and items contained within the polygonal area. Furthermore, the user may, for the purpose of generating feedback information, provide a separate set of polygon mapping information that contains more detailed information to generate a more detailed and insightful feedback report. Thus, depending on the granularity of the polygon mapping information, pageview represents viewer's interests in the content contained in the polygonal area of a polygon. In one extreme, where the viewport does not include any polygon, none of the pageview of the polygons will be varied. In the other extreme, where the viewport displays a single polygon, only the pageview of that polygon will be varied. In one implementation, the pageview will be incremented by 1. In between the two extremes, the viewport may intersect one or more polygons and the pageview of each polygons may be varied depending on various factors including relative viewport position, weighing factors and typical screen sizes of viewers.

Referring to FIG. 23A, an example viewport 2300A intersecting three polygons 2302, 2304 and 2306 is shown. Using the device information, such as the viewport information containing viewport coordinates (x1, y1), and (x2, y2), the feedback data analyzer 260 determines the area of each polygons 2302, 2304 and 2306 proportional to the viewport 2300A. In this example, the feedback data analyzer 260 may determine that polygons 2302, 2304 and 2306 occupy 0.2, 0.5 and 0.3 of the available area in the viewport 2300A. In one implementation, the pageview of each polygon may be incremented by the proportion of the viewport area occupied (i.e. 0.2, 0.5 and 0.3). In another implementation, the proportional area (i.e. proportion of the viewport area occupied by the polygon) determined may be varied by a multiple.

In a more advanced implementation, the feedback data analyzer 260 may consider other factors. For example, because of the varying screen sizes of viewers, the feedback data analyzer 260 may normalize the feedback information using a typical viewport 2310. In this context, normalization refers to the process of averaging out the feedback information to remove the skewing effects of extreme data sets. Because viewport 2300A may be changed by the viewer, the pageview for the polygon may be skewed. Referring to FIG. 23B, the viewer may have decreased the viewport 2300B to occupy only a small portion of the available screen real estate. In this configuration, the viewport 2300B will generate multiple pageviews for polygon 2304. Thus, one implementation would be to vary the proportional area by a weighting factor, such as a ratio between the viewport size and the typical viewport 2310. So, if viewport 2300B was determined to have an area of 1, while the area of the typical viewport 2310 is 100, the pageview generated by the viewport 2300B would have a weighing factor of only 0.01. Thus, the pageviews generated by the viewport 2300B would be made marginal. The same normalization process may be applied to large screens.

In another implementation, the weighting factor may be dependent on the differential area between the viewport and the typical viewport 2310. For example, in FIG. 23A, the area within the typical viewport 2310, may be weighed at 100% while the area between the typical viewport 2310 and the viewport 2300A may be weighed at 50%, or another reduced percentage. For smaller viewport 2300B, as shown in FIG. 2300B, the area between the viewport 2300B and the typical viewport 2310 may be weighed at a negative value (e.g. −50%) to account for the multiple pageviews generated by such small viewport 2300B.

Figure 24:
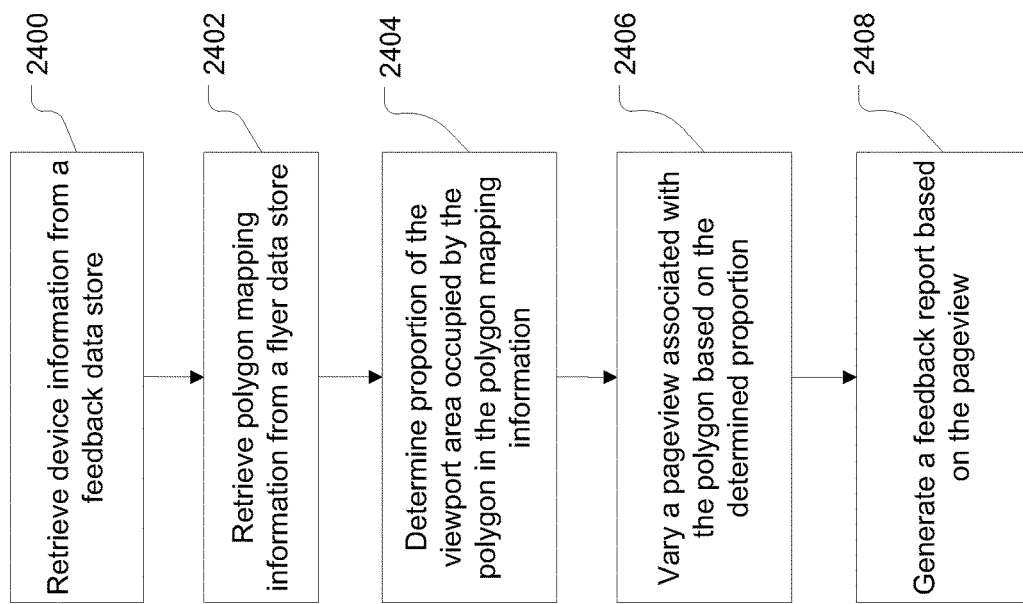
FIG. 24 illustrates a process for generating feedback using the device information and polygon mapping information according to an embodiment of the present technology.

Thus, the system generates a feedback report by retrieving device information from a feedback data store 250 (i.e. 2400 in FIG. 24). The device information may include viewport information associated with a viewport of a communication device and may include a variety information such as, but not limited to, viewport coordinates, date, time, session information, viewer information (such as IP address or geographic locale information), information about the communication device (such as operating system used by the communication device, or Internet browser used by the communication device), or any other information. The system also retrieves polygon mapping information from a flyer data store 240 (i.e. 2402 in FIG. 24). As previously described above, the polygon mapping information includes one or more polygons that each define a polygonal area with each polygon being tagged with contextual information. Using the device information and the polygon mapping information, the system determines, for each polygon in the polygon mapping information, a proportion of the viewport area that it occupies (i.e. 2404 in FIG. 24). With the determined proportional area occupied by the polygon, the pageview associated with each polygon is varied (i.e. 2406 in FIG. 24). In one implementation, the pageview is varied by a multiple of the proportional area. In another implementation, the pageview is varied by the proportional area and corrected by a weighting factor. An exemplary weighting factor may be a ratio between the viewport area and a typical viewport 2310. Another exemplary weighting factor may depend on the differential area between the viewport and the typical viewport 2310. Using the pageview information, the system then generates a feedback report (i.e. 2408 in FIG. 24).

Figure 25:
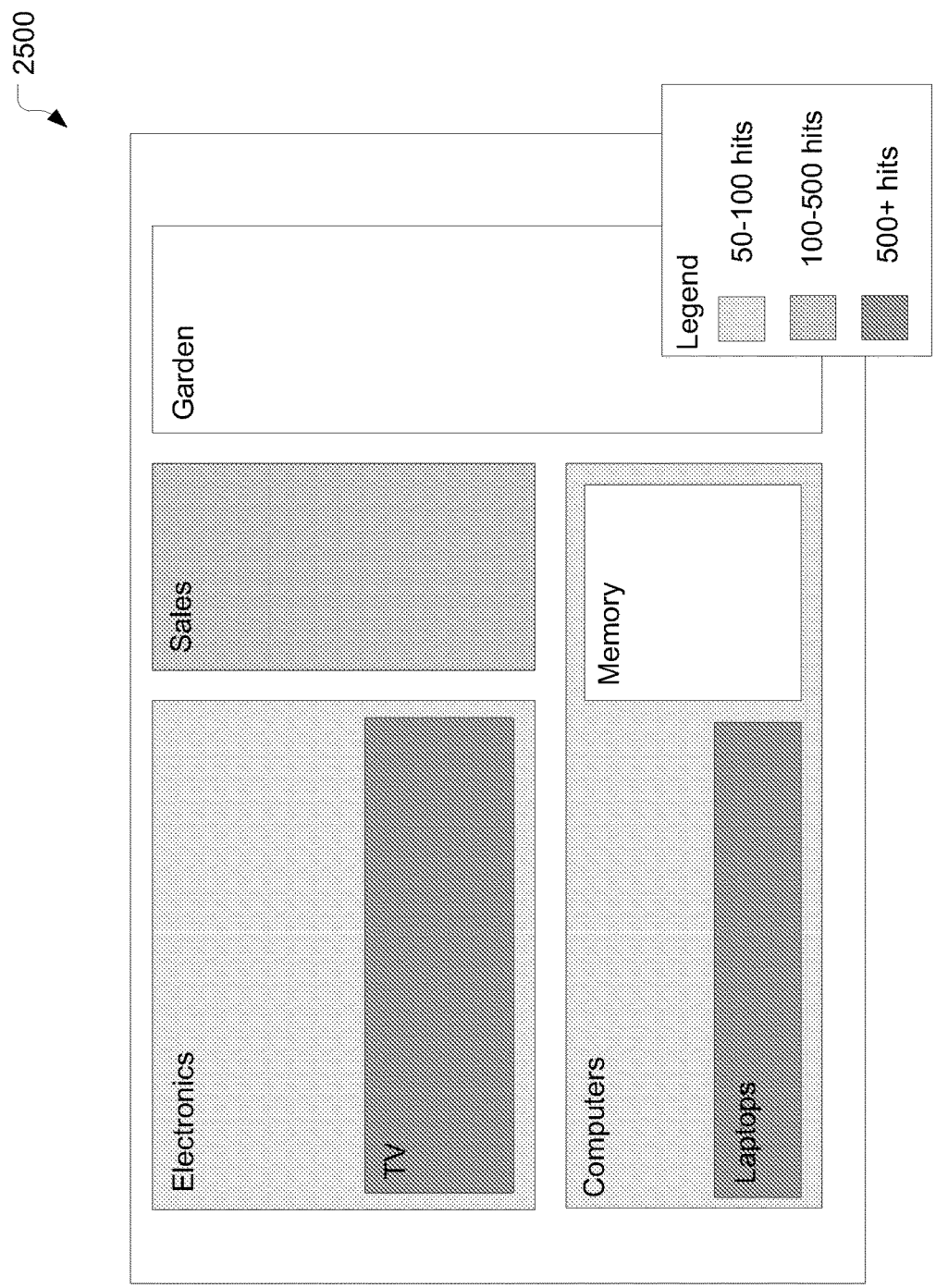
FIG. 25 depicts an embodiment of a feedback report generated using feedback data stored in the feedback system.

While the feedback report generated may be a simple output of the pageview associated with each of the polygon, a more advanced implementation may be possible by using the device information and the polygon information stored in the feedback data store 250 and the flyer data store 240. One implementation is shown in FIG. 25, which illustrates a feedback report 2500 in the form of a frequency map. It will be understood that a frequency map may also be referred to as a heat map or impression report. In this implementation, the polygon mapping information used to convey contextual information and used to generate navigational information and related information as discussed above is overlaid with the feedback information in the form of colouration to produce the feedback report 2500. As indicated in the legend, the intensity of colouration depicts a higher viewing activity by the viewers. While the colouration in FIG. 25 depicts the number of pageviews determined by the feedback data analyzer 260, the colouration may also depict other information. For example, the colouration may depict the average time spent by viewers in the given polygon.

Figure 26:
FIG. 26 depicts another embodiment of a feedback report generated using feedback data stored in the feedback system.

In another implementation of the feedback report, a different set of polygon mapping information may be used to generate the feedback report. For example, the publisher may have defined a second set of polygon mapping information that contains more granular information. As shown in FIG. 26, the "Electronics" and the "TV" sections are further broken down to the product level using a second set of polygon mapping information. For simplicity, only the "Electronics" and the TV sections are shown with more granular information. Thus, using the device information and the polygon mapping information (i.e. the second set and the initial set), the vendor is able to obtain a feedback report 2600 that is more detailed than the feedback report 2500 in FIG. 25.

In a further implementation, date, time, elapsed time and session information contained in the device information may be used to create a feedback report that reflects the viewer's viewing activity over a course of a session. This may include information aggregating a plurality of viewers, who may be grouped according to the device information. For example, viewers in a particular geographic locale may be grouped. In another implementation, the device information may include information related to the communication device (e.g. browser or operating system information extracted from HTTP header) to group users into different categories as discussed above. By relating viewer's viewing activity (i.e. pageview of the polygon) to device information such as date, time, and elapsed time, a series of feedback report representing viewer's activity at different points in time may be generated. The series of generated feedback report may be used as frames in a time-elapsed frequency map.

Figure 27:
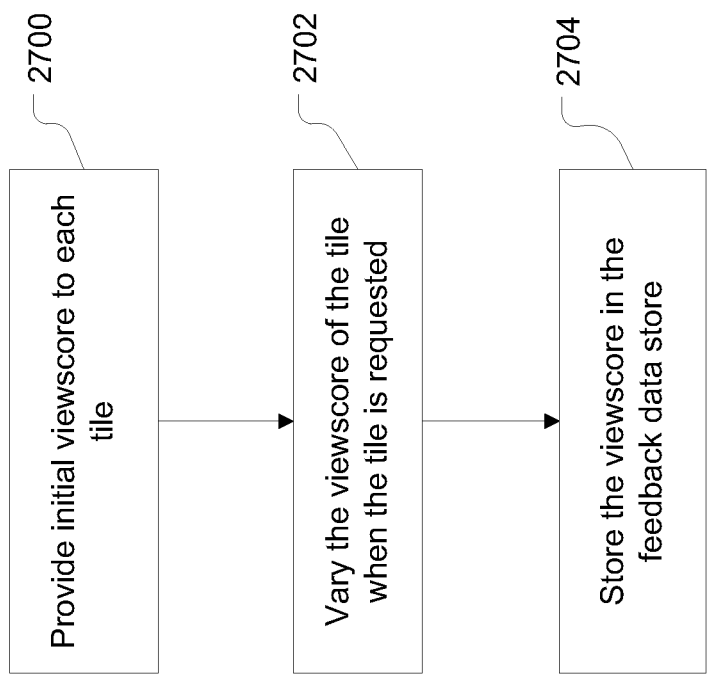
FIG. 27 depicts a process implementing a feedback system according to another embodiment of the present technology.

Now referring to FIG. 27, another embodiment for implementing a feedback system is shown. In this particular embodiment, feedback information is generated by taking advantage of the flyer image tile set as described above. While this embodiment will be described separately from the feedback system using polygon mapping information as discussed referring to FIGS. 23-26, it will be understood that the two embodiments may be implemented as a single system by leveraging a combination of information conveyed through polygon mapping information, flyer image tile sets served, and device information.

In FIG. 27, the interactive flyer system 200 provides an initial viewscore to each tile (i.e. 2700 in FIG. 27). For example, each tile may be assigned an initial viewscore of 0. Subsequently, each time the viewer zooms into the flyer page or pans across the flyer page and a new tile image is required, the system 200 not only retrieves the tile but also varies the viewscore (i.e. 2702 in FIG. 27). In one implementation, the magnitude of variation may depend on the relative position of the tile in the viewport. For example, an image tile at the centre of the viewport may be assigned a higher magnitude of variation than an image tile at the edge of the viewport. In another implementation, the magnitude of variation may depend on the zoom level of the tile. For example, image tiles at deeper zoom level may be assigned a higher magnitude of variation since serving such tiles signifies greater interest from the viewer. In a further implementation, the magnitude of variation may depend on viewer events such as zoom-in, click, and time spent. For clarity, it will be noted that variation refers to both increase and decrease of the viewscore. Optionally, the system 200 may also note the date and time when the viewscore was varied. The viewscore is then stored in the feedback data store 250 (i.e. 2704 in FIG. 27). Storing of the viewscore may be initiated periodically at pre-defined intervals.

Figure 28:
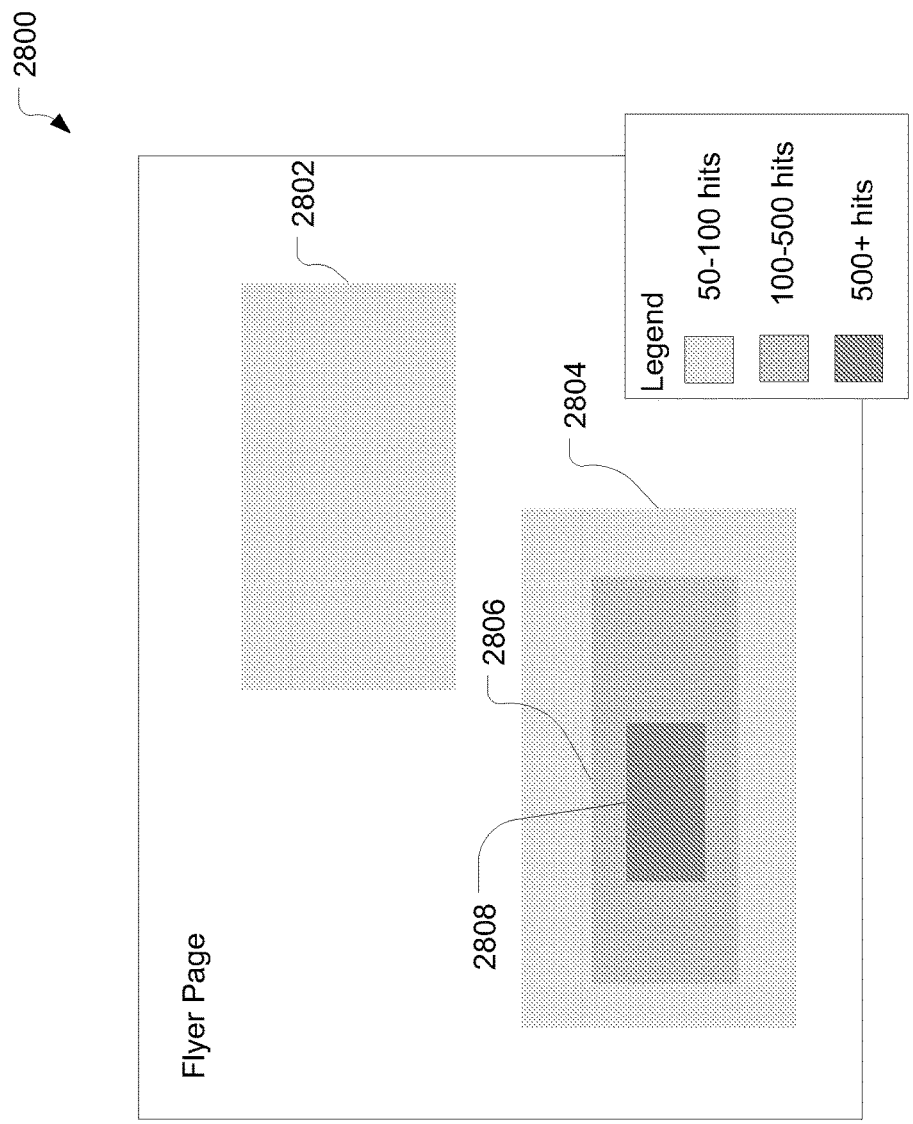
FIG. 28 depicts another embodiment of a feedback report generated using feedback data stored in the feedback system.

The feedback data store 250 contains the viewscore associated with the flyer image tiles, which provides information related to the behaviour of the viewer. Such implicit feedback information may be valuable information to both the vendor and the publisher, which was not possible with previous digital flyer system. In a simple implementation, the collected information may be exported in a text format or displayed in a textual representation such as a table. In another implementation, the viewscore may be used to produce a frequency map that gives a visual representation of the interest level of the viewer. FIG. 28 shows an example of such frequency map, which may also be referred to as coloured frequency map, heat map, or impression report. The feedback report 2800 of FIG. 28 shows viewer interests depicted by different colour schemes. In the report 2800, area 2802 and 2804 received 50-100 hits from the viewers, while area 2806 received 100-500 hits from the viewers. The area of the flyer page that received the most attention is area 2808, which received 500+ hits. This type of report illustrates the behaviour of the viewers and is made possible by plotting the viewscore of each tile.

Different implementations of the map are possible. For example, the feedback data store 250 may also keep the date and time at which the viewscores were incremented or decremented. By storing the date and time at which the viewscores changed, a timeline-based feedback report may be provided. In a further embodiment, the feedback data store 250 may keep the IP address of the viewer to distinguish between unique/repeat viewers, and locales of the viewers. By varying the type of data collected along with the viewscore, various data may be made available on the feedback report.

In a further embodiment, the system 200 may leverage the polygon mapping information stored in the flyer data store 240 to provide a feedback report such as the one shown in FIG. 25 or 26. In generating the feedback report 2500 or 2600, the system 200 may summate the viewscore of the tiles in each polygonal area and provide a feedback report 2500 or 2600 that describes the relative interest level of each section.

Additionally, the information stored in the feedback data store 250 may be used to improve the quality of the data. In one implementation, information in the feedback data store 250 may be used to validate the points of interests (such as 1702, 1704 and 1706 in FIG. 17) stored in the flyer data store 240. After the initial creation of the points of interests, the system 200 may analyze the behaviour of the viewer using the information stored in the feedback data store 250. With this analysis, the system 200 may remove or keep the existing points of interests. Moreover, if the flyer is generating a lot of interests in an area that was not initially tagged as a point of interest, the system 200 may dynamically tag the area as a point of interest. In effect, the interactive flyer system 200 is able to react to the behaviour of the viewers in real time. Consequently, the quality of the data managed by the system is vastly improved.

In a further embodiment, the information stored in the feedback data store 250 may be provided to the polygon mapping module 230. In one embodiment, the feedback information may be provided to the user using the interface for defining the polygon mapping information. This may be in the form of an indication that informs the user, at the time of the polygon mapping, including defining points of interests, which sections or products have previously attracted much attention from viewers. Through such information, vendors would be able to accurately predict viewer's interests and highlight information knowing that it would attract much attention from the viewers. In another embodiment, the polygon mapping module 230 may use the feedback information to define the polygon mapping information, including points of interests, based on predetermined information, such as vendor-published agreed format, as previously discussed.

In addition to improving the quality of the flyer data, the feedback information may be used to improve the efficiency of the interactive flyer system 200. In a traditional non-tiled image-based flyer system, a high quality version of the flyer was downloaded either in full or page-by-page. In more advanced systems, a lower quality of the image may have been initially downloaded to provide a preview before downloading the full version. However, because such systems could not take implicit feedback information into consideration, the full image was downloaded even when the viewers never in fact looked at the entire image. Moreover, caching prediction did not change with viewer's behaviour. According to an embodiment of the present technology, predictive caching is based on implicit feedback information. Additionally, or alternatively, predictive caching is based on the contextual information conferred through polygon mapping information.

Generally, retrieving graphical information over a network can be a performance bottleneck. By storing the information locally, performance of the system can be dramatically improved. However, caching may also be wasteful if the cached information is never utilized. In the present technology, caching prediction is made highly accurate by incorporating the information from viewer's behaviour.

In one embodiment, caching prediction may be based on the viewscores assigned to the image tiles. Since high viewscores signify high level of viewing activity, the interactive flyer system 200 may preemptively retrieve those image tiles. This is under the assumption that by caching those image tiles, a high cache hit rate would be realized. Moreover, since viewscores are updated with viewer's behaviour, the predictive caching would also dynamically vary with the viewer's behaviour. Thus, the interactive flyer system can stay nimble and efficient by constantly changing to the viewer's interests.

Figure 29:
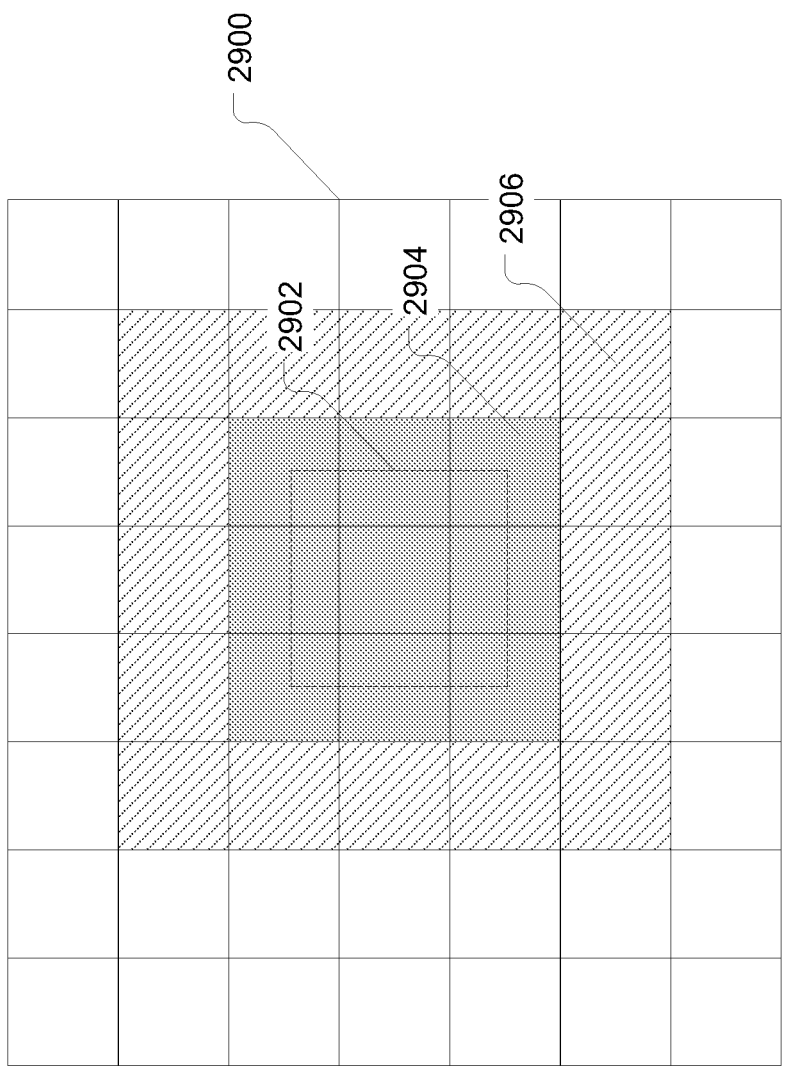
FIG. 29 illustrates an embodiment for predictively caching the flyer image tiles by using the feedback data stored in the feedback system.

In another embodiment, the interactive flyer system 200 may retrieve flyer image tiles (for caching) under the assumption that the viewer is likely to browse to the surrounding area of the flyer. For example, referring to FIG. 29, a tiled flyer image 2900 with viewport 2902 is shown. With the current position of the viewport 2902, the interactive flyer system 200 would retrieve the tiled flyer images as shown in the shaded portion 2904. However, after retrieval of the shaded portion 2904, the interactive flyer system 200 may further retrieve tiled flyer images in the surrounding portion 2906 under the assumption that the viewer is likely to pan to the surrounding area. Additionally, or alternatively, the interactive flyer system 200 may retrieve the tiled flyer images at one or more extra deeper levels of zoom contained within the viewport 2902.

Figure 30:
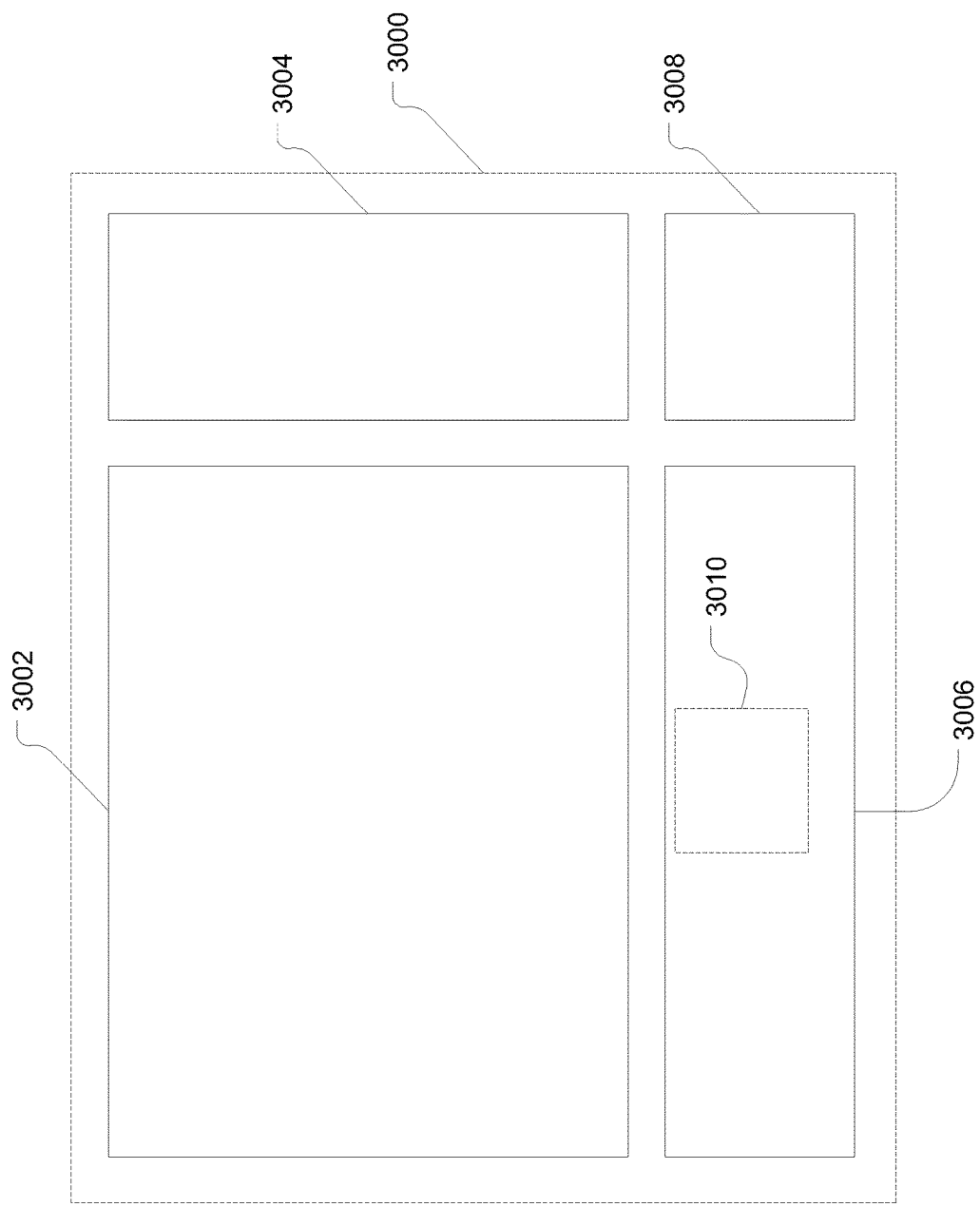
FIG. 30 illustrates another embodiment for predictively caching the flyer image tiles by using contextual information conveyed through polygon mapping information.

In a further embodiment, the interactive flyer system 200 may incorporate the contextual information provided by the polygon mapping information. For example, referring to FIG. 30, flyer page 3000 with polygons 3002, 3004, 3006 and 3008 is shown. By considering the viewer's current viewport 3010, the interactive flyer system 200 may retrieve all the tiled flyer images within the polygon 3006. Under this predictive caching scheme, the interactive flyer system 200 may assume that the viewer will continue to view items that belong to the same context (i.e. within the polygon 3006). For example, if the viewer's viewport is currently within the "Electronics" section, it is likely that the viewer will continue to peruse through the "Electronics" section or, perhaps, continue to a related section. It may also be likely that when the viewport 3010 approaches closer to the edges of polygon 3006, the flyer image processor may further retrieve tiled flyer data images of nearby polygons. For example, if the viewport 3010 is closer to the top edge of polygon 3006, the interactive flyer system 200 may retrieve tiled flyer images in the polygon 3002. Thus, through the use of contextual information enabled by the polygon mapping information according to an embodiment of the present technology, caching is improved.

In an interactive flyer system 200 that incorporates both polygon mapping information and tiled flyer images, the system may consider both contextual and implicit feedback information to determine the order in which the tile images are cached. In one exemplary implementation, predictive caching may be associated with the relative position of the viewport (i.e. image tiles and zoom level), the polygon mapping and the aggregate popularity derived from the implicit feedback. In this implementation, tiles that are closer to the centre of the viewport and at the current zoom level may be assigned a higher caching score. From thereon, tiles at the same zoom level but further from the centre of the viewport may be assigned a lower caching score. The system may also assign caching scores to tiles that are located deeper in the zoom levels, with the scores being varied depending on their proximity to the centre of the viewport. In addition to the relative position, the system may also consider the polygon mapping and the implicit feedback information to arrive at a holistic predictive scheme that is not only dependent on the current viewer but also the aggregate popularity of the flyer based on other viewers.

While the patent disclosure is described in conjunction with the specific embodiments, it will be understood that it is not intended to limit the patent disclosure to the described embodiments. On the contrary, it is intended to cover alternatives, modifications, and equivalents as may be included within the scope of the patent disclosure as defined by the appended claims. In the description below, numerous specific details are set forth in order to provide a thorough understanding of the present patent disclosure. The present patent disclosure may be practiced without some or all of these specific details. In other instances, well-known process operations have not been described in detail in order not to unnecessarily obscure the present patent disclosure.

It is further understood that the use of relational terms such as first and second, and the like, if any, are used solely to distinguish one from another entity, item, or action without necessarily requiring or implying any actual such relationship or order between such entities, items or actions.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Some portions of the detailed description in the above are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the above discussions, it is appreciated that throughout the specification discussions utilizing terms such as "processing," "computing," "calculating," "determining," or the like, refer to the action and/or processes of a computer or computing system, or similar electronic computing media player device, that manipulate and/or transform data represented as physical, such as electronic, quantities within the computing system's registers and/or memories into other data similarly represented as physical quantities within the computing system's memories, registers or other such information storage, transmit session or display devices.

Embodiments within the scope of the present disclosure can be implemented in digital electronic circuitry, or in computer hardware, firmware, software, or in combinations thereof. Apparatus within the scope of the present disclosure can be implemented in a computer program product tangibly embodied in a machine-readable storage medium for execution by a programmable processor; and method actions within the scope of the present disclosure can be performed by a programmable processor executing a program of instructions to perform functions of the present disclosure by operating on input data and generating output. Embodiments within the scope of the present disclosure may be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files. Embodiments within the scope of the present disclosure include computer-readable media for carrying or having computer-executable instructions, computer-readable instructions, or data structures stored thereon. Such computer-readable media may be any available media, which is accessible by a general-purpose or special-purpose computer system. Examples of computer-readable media may include physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system. Any of the foregoing can be supplemented by, or incorporated in, ASICs (application-specific integrated circuits). It should be understood that embodiments of the present disclosure may be used in a variety of applications. Although the present disclosure is not limited in this respect, the methods disclosed herein may be used in many apparatuses such as in the transmitters, receivers and transceivers of a radio system. Radio systems intended to be included within the scope of the present disclosure include, by way of example only, cellular radiotelephone communication systems, satellite communication systems, two-way radio communication systems, one-way pagers, two-way pagers, personal communication systems (PCS), personal digital assistants (PDA's), notebook computers in wireless local area networks (WLAN), wireless metropolitan area networks (WMAN), wireless wide area networks (WWAN), or wireless personal area networks (WPAN, and the like).

What is claimed is:

1. A method of generating an interactive digital flyer comprising:
    storing an image of a flyer as a base layer of the interactive digital flyer;
    defining a plurality of polygonal areas each covering a respective area of the image of the flyer;
    associating contextual information with each of the plurality of polygonal areas;
    storing the plurality of polygonal areas and associated contextual information as a data layer of the interactive digital flyer;
    generating co-ordinate and scaling information for use in correlating the data layer to the base layer when displayed;
    storing the co-ordinate and scaling information as a geometry layer of the interactive digital flyer; and
    in response to receiving a request from a device, retrieving the stored interactive digital flyer and providing the digital flyer for display on the device.

2. The method of claim 1, further comprising storing in the base layer a plurality of images of the flyer, each having different dimensions corresponding to different view port sizes.

3. The method of claim 2, further comprising, for each of the plurality of images of the flyers storing a plurality of images of the flyer, each having different resolutions corresponding to different levels of zoom.

4. The method of claim 3, wherein each of the plurality of images comprises an image tile set.

5. The method of claim 1, wherein the contextual information associated with one or more of the polygonal areas provides a description of a respective area of the image of the flyer covered by the respective one of the one or more polygonal areas.

6. The method of claim 1, wherein the contextual information associated with one or more of the polygonal areas provides feedback information for use in generating viewer feedback of the digital flyer.

7. The method of claim 1, wherein the contextual information associated with one or more of the polygonal areas provides navigational information for use in generating a navigation interface for the digital flyer.

8. The method of claim 1, wherein the plurality of polygonal areas are defined in a hierarchical arrangement.

9. A non-transitory computer readable medium storing instructions, which when executed by a computing device configure the computing device to perform a method of generating an interactive digital flyer comprising:
    storing an image of a flyer as a base layer of the interactive digital flyer;
    defining a plurality of polygonal areas each covering a respective area of the image of the flyer;
    associating contextual information with each of the plurality of polygonal areas;
    storing the plurality of polygonal areas and associated contextual information as a data layer of the interactive digital flyer;
    generating co-ordinate and scaling information for use in correlating the data layer to the base layer when displayed;
    storing the co-ordinate and scaling information as a geometry layer of the interactive digital flyer; and
    in response to receiving a request from a device, retrieving the stored interactive digital flyer and providing the digital flyer for display on the device.

10. The computer readable medium of claim 9, wherein the method further comprises storing in the base layer a plurality of images of the flyer, each having different dimensions corresponding to different view port sizes.

11. The computer readable medium of claim 10, wherein the method further comprises, for each of the plurality of images of the flyers storing a plurality of images of the flyer, each having different resolutions corresponding to different levels of zoom.

12. The computer readable medium of claim 11, wherein each of the plurality of images comprises an image tile set.

13. The computer readable medium of claim 9, wherein the contextual information associated with one or more of the polygonal areas provides a description of a respective area of the image of the flyer covered by the respective one of the one or more polygonal areas.

14. The computer readable medium of claim 9, wherein the contextual information associated with one or more of the polygonal areas provides feedback information for use in generating viewer feedback of the digital flyer.

15. The computer readable medium of claim 9, wherein the contextual information associated with one or more of the polygonal areas provides navigational information for use in generating a navigation interface for the digital flyer.

16. The computer readable medium of claim 9, wherein the plurality of polygonal areas are defined in a hierarchical arrangement.

17. A computing device for generating an interactive digital flyer comprising:
a processor for executing instructions; and
a memory for storing instructions, which when executed by the processor configure the computing device to perform a method of generating an interactive digital flyer comprising:
storing an image of a flyer as a base layer of the interactive digital flyer;
defining a plurality of polygonal areas each covering a respective area of the image of the flyer;
associating contextual information with each of the plurality of polygonal areas;
storing the plurality of polygonal areas and associated contextual information as a data layer of the interactive digital flyer;
generating co-ordinate and scaling information for use in correlating the data layer to the base layer when displayed;
storing the co-ordinate and scaling information as a geometry layer of the interactive digital flyer; and
in response to receiving a request from a device, retrieving the stored interactive digital flyer and providing the digital flyer for display on the device.

18. The computing device of claim 17, wherein the method further comprises storing in the base layer a plurality of images of the flyer, each having different dimensions corresponding to different view port sizes.

19. The computing device of claim 18, wherein the method further comprises, for each of the plurality of images of the flyers storing a plurality of images of the flyer, each having different resolutions corresponding to different levels of zoom.

20. The computing device of claim 19, wherein each of the plurality of images comprises an image tile set.

21. The computing device of claim 17, wherein the contextual information associated with one or more of the polygonal areas provides a description of a respective area of the image of the flyer covered by the respective one of the one or more polygonal areas.

22. The computing device of claim 17, wherein the contextual information associated with one or more of the polygonal areas provides feedback information for use in generating viewer feedback of the digital flyer.

23. The computing device of claim 17, wherein the contextual information associated with one or more of the polygonal areas provides navigational information for use in generating a navigation interface for the digital flyer.

24. The computing device of claim 17, wherein the plurality of polygonal areas are defined in a hierarchical arrangement.

* * * * *